US009279706B2

(12) United States Patent
Khalifa

(10) Patent No.: US 9,279,706 B2
(45) Date of Patent: Mar. 8, 2016

(54) FLOW AREA REDUCTION IN VORTEX FLOWMETERS USING BORE REDUCTION TECHNIQUES

(71) Applicant: Yokogawa Corporation of America, Sugar Land, TX (US)

(72) Inventor: Mohamed Khalifa, Smyrna, GA (US)

(73) Assignee: Yokogawa Corporation of America, Sugar Land, TX (US)

(*) Notice: Subject to any disclaimer, the term of this patent is extended or adjusted under 35 U.S.C. 154(b) by 29 days.

(21) Appl. No.: 14/173,653

(22) Filed: Feb. 5, 2014

(65) Prior Publication Data
US 2015/0027234 A1   Jan. 29, 2015

Related U.S. Application Data

(60) Provisional application No. 61/857,597, filed on Jul. 23, 2013.

(51) Int. Cl.
*G01F 1/32*   (2006.01)
*G01F 15/00*   (2006.01)

(52) U.S. Cl.
CPC ............ *G01F 1/3209* (2013.01); *G01F 1/3218* (2013.01); *G01F 15/00* (2013.01)

(58) Field of Classification Search
CPC .................................... G01F 1/32; G01F 1/44
USPC .............................. 73/861.22, 861.64, 861.24
See application file for complete search history.

(56) References Cited

U.S. PATENT DOCUMENTS

| 4,003,253 A | 1/1977 | Yard et al. |
| 4,240,293 A | 12/1980 | Hughes |
| 4,437,349 A * | 3/1984 | Joy ........................... 73/861.22 |

(Continued)

FOREIGN PATENT DOCUMENTS

| JP | 58077620 A | 5/1983 |
| WO | 8401215 A1 | 3/1984 |

OTHER PUBLICATIONS

International Search Report and Written Opinion for International Application No. PCT/US2014/047831 mailed Nov. 26, 2014 (14 pgs.).

(Continued)

*Primary Examiner* — Jewel V Thompson
(74) *Attorney, Agent, or Firm* — Sutherland Asbill & Brennan LLP

(57) ABSTRACT

Certain embodiments herein relate to configurations for reducing the flow area for fluids traveling through a Vortex flowmeter. Such configurations may establish a minimum required Reynolds number consistent with optimized performance of the Vortex flowmeter. Various configurations for achieving optimized performance may include inserting one or more segments or a streamlined, torpedo-shaped body into a bore of a meter body of the Vortex flowmeter to block a certain cross-sectional area of the bore. By reducing the cross-sectional area of the bore, the Reynolds number of fluids may be increased to the optimized level. Another configuration may include reducing the diameter of the bore of the meter body. Any of these configurations may be implemented to achieve a desired Reynolds number, and hence, optimized performance. Certain embodiments herein also relate to determining or calculating precise or near precise sizes for segment insertions, torpedo body diameters, and diameters of the meter body.

20 Claims, 16 Drawing Sheets

(56) References Cited

U.S. PATENT DOCUMENTS

| | | | |
|---|---|---|---|
| 4,984,470 A * | 1/1991 | Hayward et al. | 73/861.22 |
| 5,808,209 A | 9/1998 | Zielinska et al. | |
| 6,003,383 A * | 12/1999 | Zielinska et al. | 73/861.22 |
| 6,003,384 A * | 12/1999 | Frohlich et al. | 73/861.22 |
| 6,938,496 B2 * | 9/2005 | Koudal et al. | 73/861.22 |
| 7,047,822 B2 | 5/2006 | Good et al. | |
| 7,401,572 B2 | 7/2008 | Donehue | |
| 7,533,579 B2 * | 5/2009 | Lewicke | 73/861.22 |
| 8,548,753 B2 * | 10/2013 | Rogers et al. | 702/47 |
| 2007/0163361 A1 | 7/2007 | Lewicke | |
| 2008/0072686 A1 * | 3/2008 | Hoecker | 73/861.22 |
| 2011/0061469 A1 * | 3/2011 | Maahs | 73/861.22 |
| 2011/0138929 A1 | 6/2011 | Young | |
| 2011/0219885 A1 | 9/2011 | Shumilov et al. | |
| 2014/0260666 A1 * | 9/2014 | Brand | 73/861.22 |

OTHER PUBLICATIONS

International Search Report and Written Opinion for International Application No. PCT/US2014/047835 mailed Nov. 12, 2014 (12 pgs.).

* cited by examiner

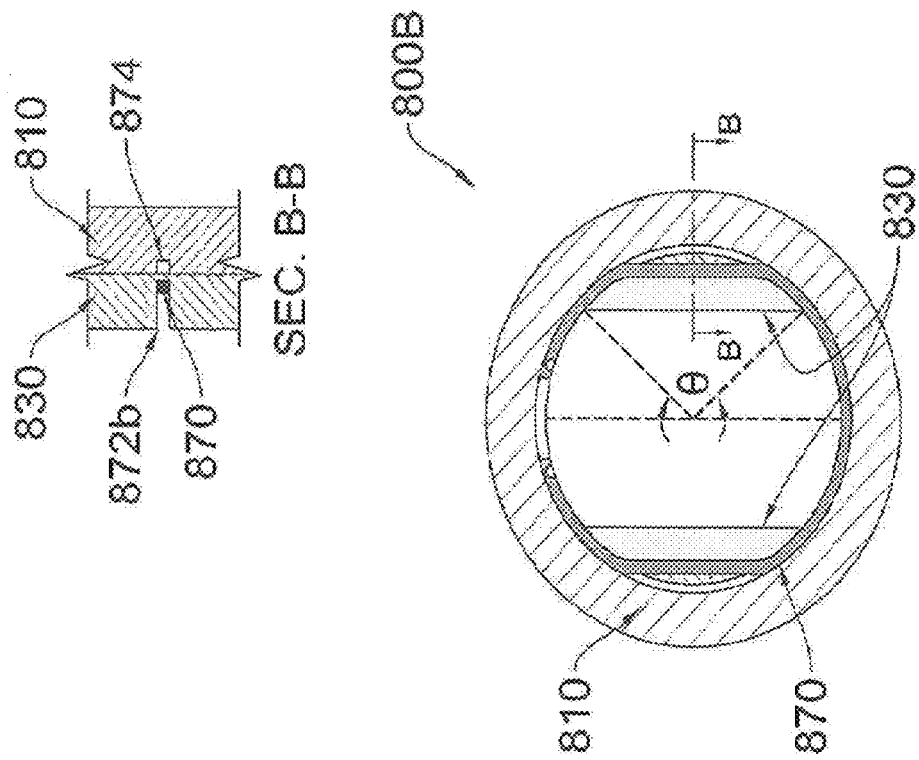
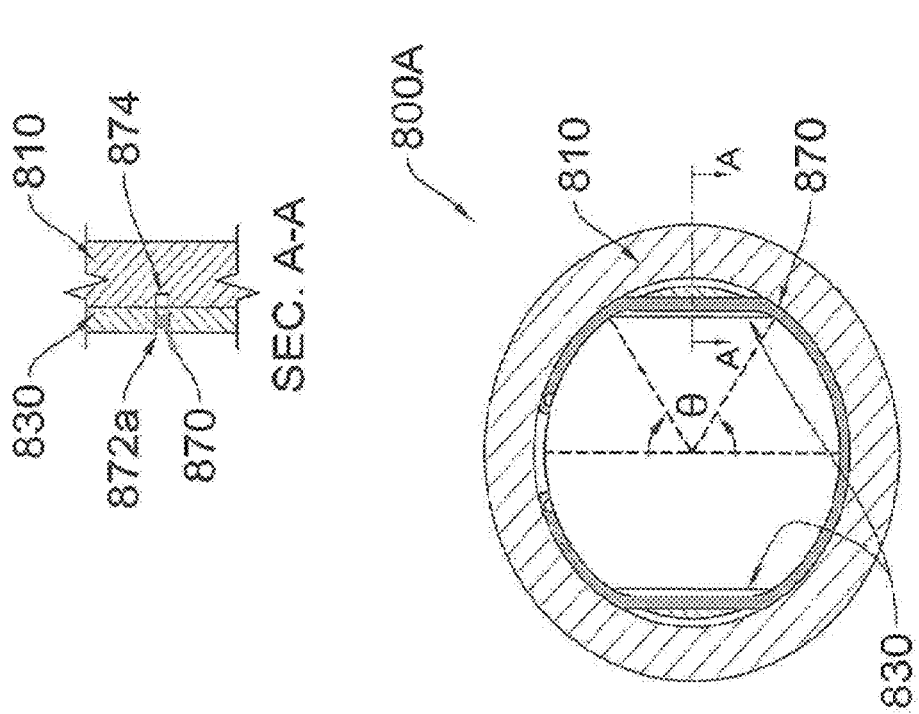

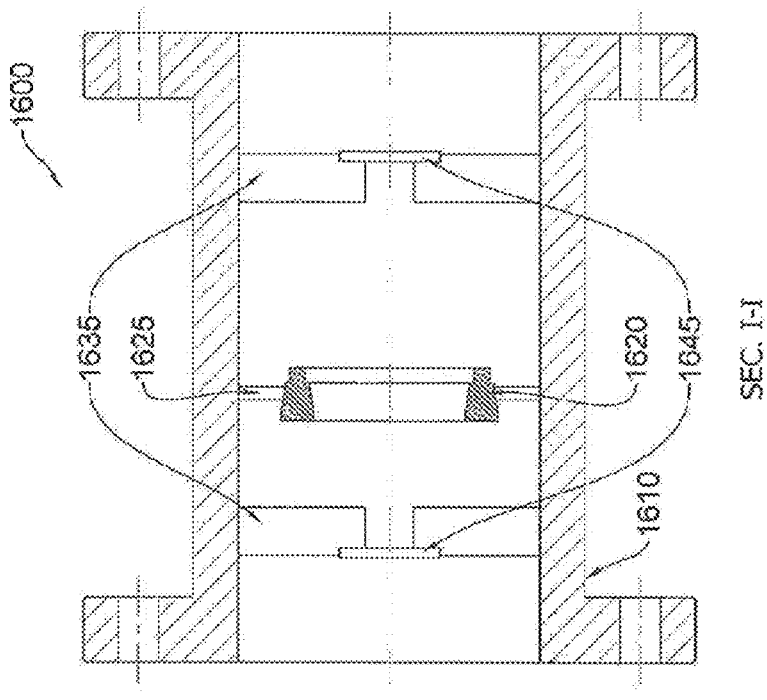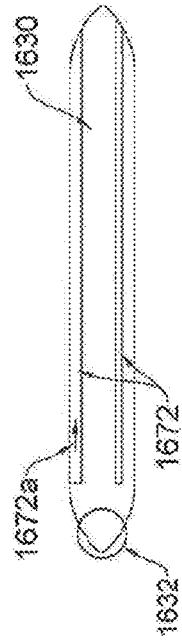
FIG. 16A
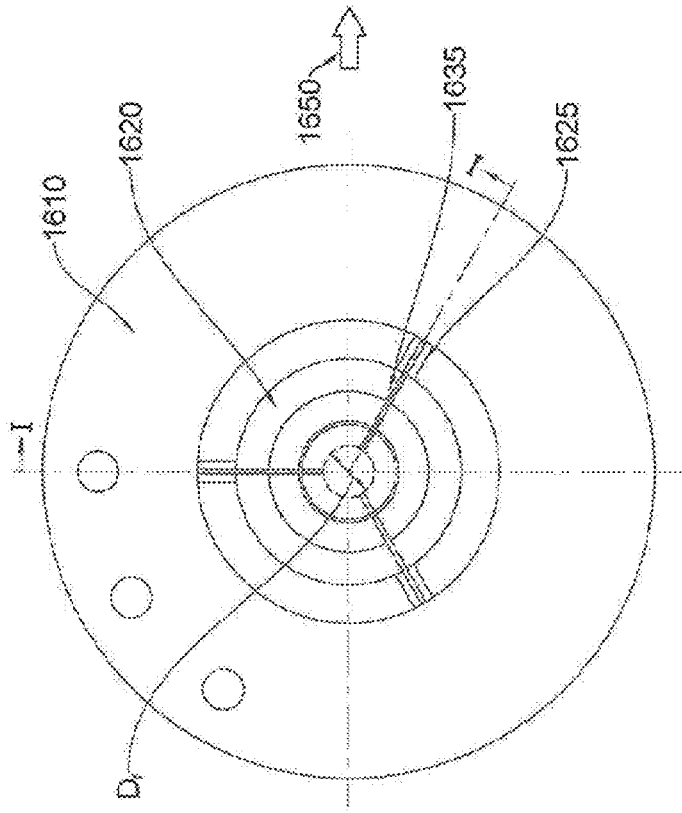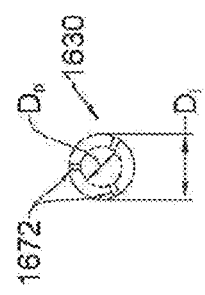
FIG. 16B

FLOW AREA REDUCTION IN VORTEX FLOWMETERS USING BORE REDUCTION TECHNIQUES

CROSS-REFERENCE TO RELATED APPLICATIONS

The present application claims priority under 35 U.S.C. §119(e) to U.S. Provisional Patent Application No. 61/857,597, filed on Jul. 23, 2013, entitled "Reduced Flow Area for Vortex Ring Flowmeters," the entire contents of which are hereby incorporated by reference in their entirety. Additionally, this application is related to U.S. patent application Ser. No. 14/173,649, filed concurrently with the present application on Feb. 5, 2014, entitled "Flow Area Reduction Techniques Using a Centralized Streamlined Body in Vortex Flowmeters."

TECHNICAL FIELD

Embodiments of this disclosure relate generally to Vortex flowmeters, and more particularly, methods and apparatuses for modifying the conduit portion area through which fluid flows through Vortex flowmeters.

BACKGROUND

The performance of Vortex flowmeters may be hindered by existing sizes and configurations of conduits connected to the flowmeters. Such sizes and configurations may make it difficult for the Vortex flowmeter to meet a certain minimum Reynolds number to achieve maximum performance in a cost-effective and efficient manner. In some instances, reducing the conduit size to a certain extent to achieve maximum performance may be very expensive and may result in additional pressure losses. While existing flowmeters may be replaced by smaller sizes to achieve maximum performance, doing so may not only be expensive, but is also may be only a temporary solution as changing conditions in the operation of the flowmeters or changes in the environment in which the flowmeters operate may necessitate further flowmeter replacement to maintain maximum performance. Numerous other challenges may threaten optimal performance of the Vortex flowmeters.

BRIEF DESCRIPTION OF THE FIGURES

FIG. 8A illustrates a retaining ring that may secure peripheral segments having a central angle (θ) that is the minimum allowable size, according to an embodiment of the disclosure.

FIG. 8B illustrates a retaining ring that may secure peripheral segments having a central angle (θ) that is the maximum allowable size, according to an embodiment of the disclosure.

FIG. 16A illustrates an example configuration for mounting a replaceable central streamlined body to a flanged meter body of a Vortex ring flowmeter, according to an embodiment of the disclosure.

FIG. 16B illustrates an example configuration of the Vortex ring flowmeter in FIG. 16A, according to an embodiment of the disclosure.

Figure 1:
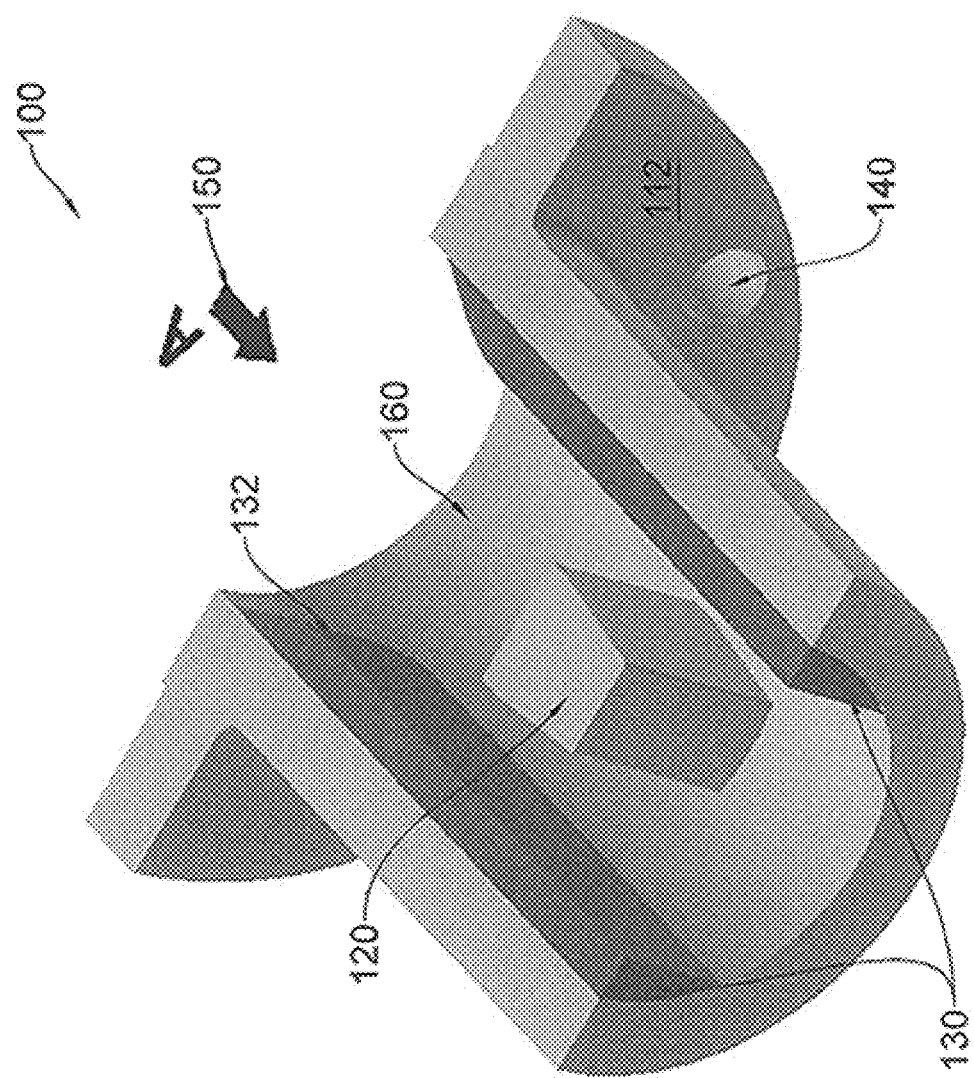
FIG. 1 illustrates a Vortex flowmeter that includes a shedder bar and peripheral segments for reducing the cross-sectional area of the conduit portion, according to an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers may refer to like elements throughout.

DETAILED DESCRIPTION

The vortex generation technology may cover a wide range of types. Example embodiments herein are related to vortex generation using vortex shedder bodies. Certain configurations herein may include various types of bluff bodies that may generate, induce, or otherwise cause vortex shedding of fluids traveling through a bore or conduit of the meter body of a Vortex flowmeter. Concepts associated with vortex shedding will be described in greater detail below. One type of shedder body may include a vortex shedder bar that is disposed within a conduit of the meter body and spans at least a portion of the diameter of the conduit of the meter body. Another type of shedder body may include a vortex ring generator (herein, such a flowmeter may be referred to as "vortex ring flowmeter"), which may be a ring or generally circular-shaped or looped-shaped body disposed within the conduit of the meter body. Both types of configurations, among others, are described herein. For example, FIGS. 1-8B may be directed to flow area reduction in vortex flowmeters using peripheral conduit reduction techniques in vortex flowmeters configured with shedder bars. Such flow area reduction techniques are described in greater detail in Section I. As another example, FIGS. 9-16B may be directed to flow area reduction techniques using a centralized streamlined body in vortex flowmeters configured with a vortex ring generator. Such flow area reduction techniques are described in greater detail in Section II.

In some embodiments, all or at least a portion of the configurations and/or functionality associated with one configuration may be applicable to at least one other configuration.

Certain embodiments herein relate to, among other things, configurations for reducing the conduit flow area for fluids traveling through a Vortex flowmeter. In so doing, certain embodiments herein may establish a minimum required Reynolds number consistent with optimized performance of the Vortex flowmeter. By reducing the cross-sectional area of the conduit bore, the velocity of fluids and the Reynolds number may be increased to the optimized level. One configuration for achieving optimized performance may include blocking a portion of the flowmeter conduit bore, like using segments to block the conduit peripherals, (as described in Section I) or using streamlined (torpedo) body to block the conduit center (as described in Section II). Another configuration (that may be applicable to both the shedder bar and to the vortex ring flowmeters) may include a step reduction of the meter body size. As will be described in greater detail below, one or both of such area reduction techniques may be used to achieve a desired Reynolds number, and hence, optimized performance.

Certain embodiments herein relate to determining or calculating precise or near precise sizes for peripheral segment insertions (which may also be referred to herein as torpedo insertions, torpedoes, peripheral segments, segments, or similar), diameters of torpedoes, and conduit sizes of the meter body. The segment insertions may provide a means for adjusting fluid flow to desirable levels in the field, for example, without having to replace the Vortex flowmeter, in some embodiments. Further, by inserting segments into the meter body to reduce the flow area, the conduit size of the meter body may be more accurately sized such that pressure losses may be minimized. In this way, inserting segments into the meter body may be used in conjunction with, or independently of conduit size step reduction, to fine tune the Vortex flowmeter to block or restrict flow areas to a precise or near precise amount of area reduction in the meter body to achieve an optimized performance, in certain embodiments herein.

I. Flow Area Reduction in Vortex Flowmeters Using Peripheral Segments

FIGS. 1-8B may be directed to a type of Vortex flowmeter that includes a vortex shedder bar generator. As described herein, peripheral segments may be used in such Vortex flowmeters to reduce the flow area of the conduit of a meter body through which various types of fluid may flow. FIG. 1 depicts a Vortex flowmeter 100 that includes wedges or segment insertions 130 (referred to generally herein as "segments") for reducing the cross-sectional area in a conduit portion 160 of the Vortex flowmeter 100, according to an embodiment of the disclosure. The flowmeter 100 may include a conduit portion 160 with a circular, or other cross section shapes, that may include at least a portion of the meter body 110. For purposes of illustration, only a cross-sectional portion of a circular bore is shown. The circular bore may be a completely circular or round conduit in other illustrations. In one embodiment, the circular bore may also include at least a wall or conduit portion in the meter body 110 to which one or more segments 130 may be secured, affixed, coupled, cast in, or otherwise attached via welds, screws, bolts, adhesives, retaining rings, or other attachment mechanisms. The segments 130 may be referred to herein as peripheral circular segments in the way that they include arc-shaped elements that may fit against a peripheral circular wall of the conduit portion of the meter body 110 of the Vortex flowmeter 100. As used herein, the peripheral wedges 130 may be called segments even when the conduit portion 160 is not circular.

The Vortex flowmeter 100 may also include, but is not limited to, a shedder bar 120 in the meter body 110 and one or more flanges 112 that may include bolt holes 140, or other attachment mechanisms for connecting the flange 112 to a similar, opposing, or like flanges (for example, via bolts, screws, fasteners, etc.) for securing a connecting conduit to the Vortex flowmeter 100, in one embodiment. Each of these components may work in conjunction with one another to meet and/or exceed a minimum Reynolds number to achieve maximum performance of the Vortex flowmeter 100, as will be described in greater detail below.

Segments 130 may be secured to the wall of the conduit portion 160 of the meter body 110 to accelerate the fluid flow to achieve the desired Reynolds number. The segments 130 may be sized accordingly based at least in part on various determinations and/or calculations that will be described below. In one configuration, the segments 130 may include leading edges 132 that may increase or accelerate the velocity of fluids entering the Vortex flowmeter 100 such that the shedder bar 120 may receive the fluids (for example, liquid, gas, etc., or any combination thereof) at a higher velocity and generate stable vortices to facilitate the processes described herein. Such fluids may flow through the conduit portion 160 of the meter body 110 in the direction indicated by the arrow 150 from an upstream area to a downstream area past the shedder bar 120. In one embodiment, the segments 130 may be identical or nearly identical (for example, such that both of the segments are within acceptable size tolerances, as described in greater detail below).

The Vortex flowmeter 100 may include various other components that are not shown, such as but not limited to, one or more processors, memories, sensors (measuring vortex shedding frequency and amplitude, redundant Dual sensors, multivariable sensors, etc.), displays, or other components that may facilitate operation of a Vortex flowmeter 100 acting as a device. Such components may enable the Vortex flowmeter 100 to operate as a device in various embodiments. In one embodiment, one or more sensors may receive a measurement of a frequency of vortex shedding, as well as other measurements. A processor may execute computer-executable instructions in a memory of the Vortex flowmeter to determine a flow rate of fluid flowing through the meter body 110 based at least in part on the sensor measurement, in one embodiment. Numerous other operations or functions may be performed by the Vortex flowmeter 100 in various embodiments.

The Vortex flowmeter 100, the shedder bar 120, and the segments 130, as well as other components, may be formed from various types of materials, including stainless steel (for example, 300 series, etc.), other metals, and other materials, etc. Each of these components may be fabricated using three-dimensional (3D) printing; near net casting technologies, such as Investment Lost-wax casting, Replicast, etc.; other casting technologies; weldments; molding technologies; and other fabrication methods, etc.

The above configuration in FIG. 1 is for purposes of illustration and is not meant to be limiting. Various other configurations involving different numbers and/or types of components shown in FIG. 1 may exist, at least some of which will be described in greater detail below. For example, fewer or more of the segments 130 may exist at various locations in the conduit portion of the meter body 110 and/or on a portion of the meter body 110 other than the conduit portion.

Figure 2:
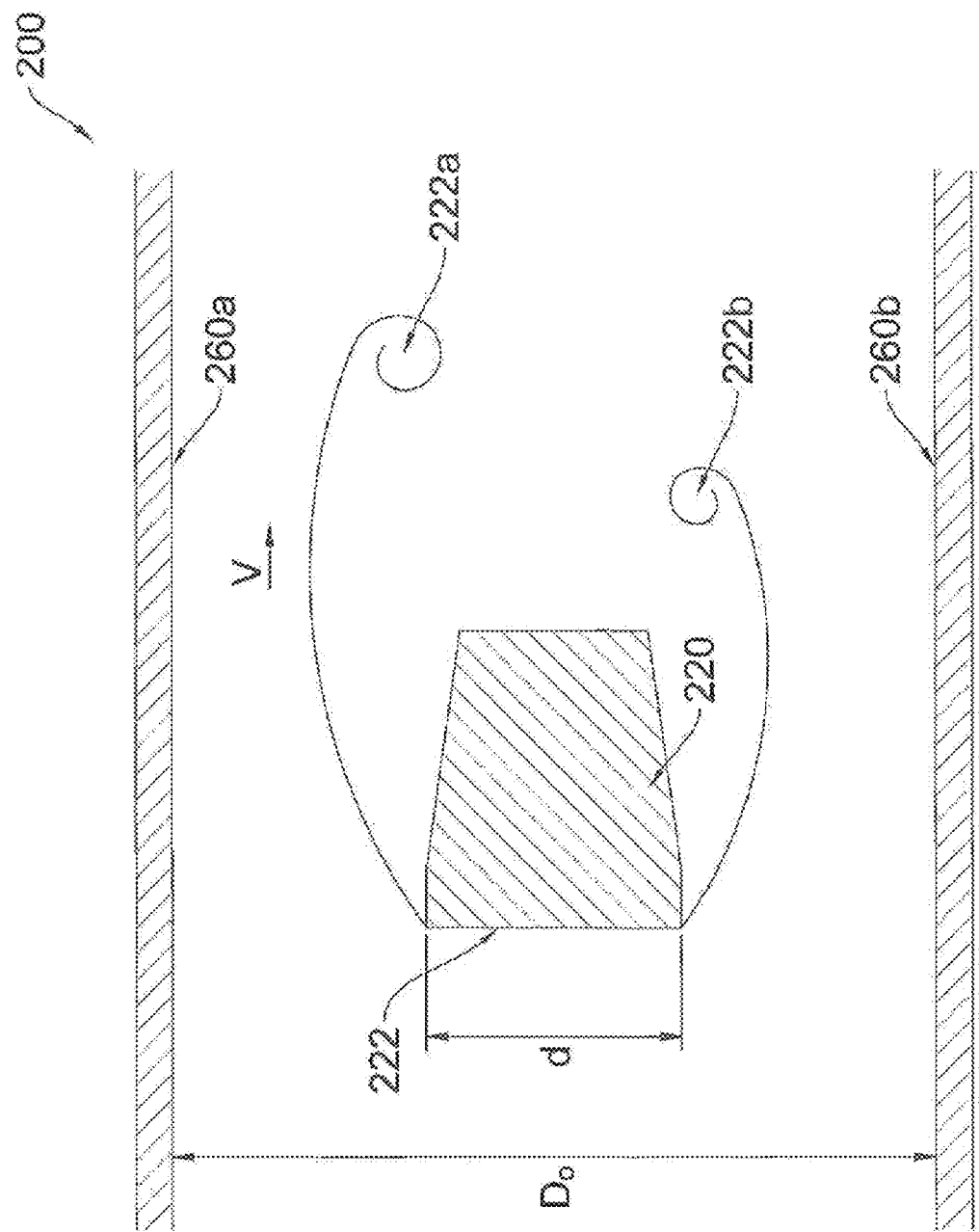
FIG. 2 illustrates components of a Vortex flowmeter and associated variables that may be used to determine an area reduction to meet a minimum desired Reynolds number, according to an embodiment of the disclosure.

FIG. 2 depicts components of a Vortex flowmeter and associated variables that may be used to determine an area of reduction to meet a minimum desired Reynolds number, according to an embodiment of the disclosure. In certain embodiments herein, the Reynolds number may be increased by reducing the cross-sectional area of a conduit portion of a meter body of a Vortex flowmeter 200. Such a conduit portion is shown to have a width $D_o$ in FIG. 2. The conduit portion is illustrated as having an upper portion 260a and a lower opposing portion 260b, for purposes of illustration. The bore may correspond to a conduit portion 160 of the meter body 110 in FIG. 1, in one embodiment. Alternating vortices 222a and 222b may be formed when fluid flowing through the conduit portion contacts the front 222 of the shedder bar 220.

In certain embodiments herein, the flow area or cross-sectional area of the conduit portion may be reduced by inserting one or more segments and/or by reducing the diameter of the bore using a step conduit reduction technique, both of which will be described in greater detail below.

In certain embodiments, Reynolds number (Re) calculations may be based on fluid flow around a body, such as the shedder bar 220. The determination of Re (based on the shedder bar width d) for such fluid flow may be as follows:

$$Re = Vd/\upsilon \text{ (referred to herein as Relation A1)}$$

where Re is the Reynolds number based on the shedder bar width,
where V is the velocity of the fluid,
where $\upsilon$ is the kinematic viscosity of the fluid, and
where d is the width of the shedder bar (e.g., the shedder bar 220).

Similar to Relation A1, Re may be based on the conduit characteristic dimension $D_o$ as follows:

$$Re = VD_o/\upsilon \text{ (referred to, herein, as Relation A2)}$$

Reynolds numbers based on the shedder bar width (Relation A1) and Reynolds numbers based on the conduit diameter (Relation A2) may differ in values for the same flow conditions. However, the values may be proportional.

For the same shedder bar width (d) and the same kinematic viscosity ($\upsilon$), the Reynolds number may be related to the cross-sectional area of the bore. Such a relationship may be determined from Relation A1 as follows:

$$Re_1/Re_2 = V_1/V_2 = a_2/a_1 \text{ (referred to herein as Equation 1)}$$

where $a_1$ is the cross-sectional area of the conduit portion based on a current Reynolds number ($Re_1$), and $a_2$ is the required cross-sectional area of the conduit portion to attain a desired Reynolds number ($Re_2$).

The required area reduction would be $\alpha = a_1 - a_2$, in one embodiment. Assuming a circular bore, the area reduction due to the insertion of two segments, such as the segments 130 in FIG. 1, may be calculated as follows:

$$\alpha = 2 * \{D_o^2/8 * [(\pi/180) * \theta - \sin \theta]\}$$

which may be reduced to the following equation:

$$\alpha = D_o^2/4 * [(\pi/180) * \theta - \sin \theta] \text{ (referred to herein as Equation 2)}$$

where $\alpha$ is the amount of area reduction ($a_1 - a_2$) required to achieve a required minimum Reynolds number, or put another way, the total blocked area by two segments in the conduit bore, and
where $\theta$ is the central angle used as a component for sizing a segment insertion.

The height of a segment insertion may be calculated as follows:

$$h = D_o/2 * [1 - \cos(\theta/2)] \text{ (referred to herein as Equation 3)}$$

where h is the height of the arced segment. Both the central angle ($\theta$) and the segment height (h) are shown below in FIG. 5.

The above equations may be used to determine the size of segments that may be inserted into a bore to achieve a desired Reynolds number.

Although the term "required" is used herein to describe certain variables and/or calculations, such as "minimum required Reynolds numbers," "required cross-sectional area," "required area reduction," "required blocked area reduction," or similar, such a term is not meant to limit or exclude possible values that are not calculated or determined in the example calculations herein. Values other than those calculated herein using the same or different equations, calculations, or determinations, may also exist.

Once the required blocked area ($\alpha$) is determined, the example flow diagram in FIG. 3 may be used to iteratively determine the central angle ($\theta$) and subsequently the height (h), in one embodiment. The same logic may be applied to other conduit portion cross-sectional configurations.

Figure 3:
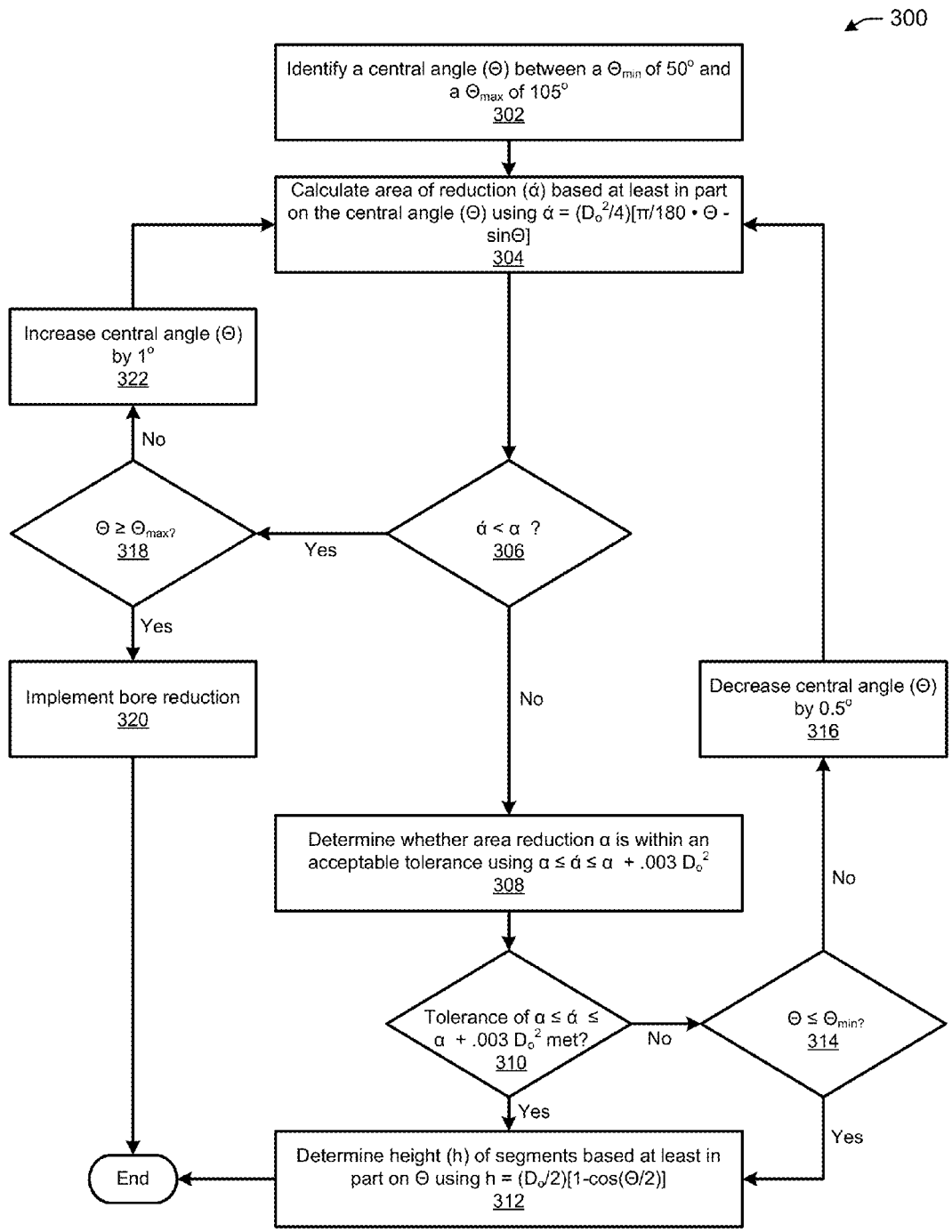
FIG. 3 illustrates a flow diagram of an example calculation process for determining a central angle (θ) and height (h) for two peripheral segments inserted into a meter body, according to an embodiment of the disclosure.

As described, the flow diagram in FIG. 3 depicts an example calculation process 300 for determining a central angle ($\theta$) and height (h) for two segments inserted into a meter body. The example process 300 may be used in conjunction with Equation 2 above to determine the central angle ($\theta$), in one embodiment. The example calculation process may begin at block 302, where a central angle ($\theta$) that is between $\theta_{min}$ and $\theta_{max}$ (herein, $\theta_{min}$ and $\theta_{max}$ may be assumed to be 50 and 105 degrees respectively) may be assumed. A central angle $\theta$ having any value within this range may be used as a starting angle for determining a central angle ($\theta$) for the segments 130.

At block 304, an area reduction alpha ($\alpha'$) based at least in part on the central angle ($\theta$) may be calculated using the equation 2 above: $\alpha' = (D_o^2/4)[\pi/180 * \theta - \sin \theta]$. The calculated area reduction ($\alpha'$) may be compared to the required area reduction ($\alpha$) to determine the next steps in the calculation process. For example, if the area reduction ($\alpha'$) is less than the area reduction ($\alpha$) as determined at block 306, then a determination may be made whether the current central angle ($\theta$) is greater than or equal to $\theta_{max}$, or 105 degrees in one embodiment, at block 318. If the current central angle ($\theta$) is not greater than or equal to $\theta_{max}$, then the central angle ($\theta$) may be increased by 1 degree to correct an underestimation of the central angle (θ), at block 322. Processing may then return to block 304, where the area reduction (α′) may be determined based at least in part on the adjusted central angle (θ) using the equation shown in block 304. In this way, a calculation of the central angle (θ) may be determined iteratively until a suitable value for attaining a desired Reynolds number is reached. At block 318, if the current central angle (θ) is greater than or equal to $\theta_{max}$, then segments may not be practical and a meter conduit size step reduction technique may be implemented to reduce the diameter ($D_o$) of the bore of the meter body, at block 320. An example bore reduction technique will be described in greater detail below.

If the area reduction (α′) is not less than the area reduction (α) as determined at block 306, then a determination may be made as to whether the area reduction (α′) is within an acceptable tolerance using the comparison $\alpha \leq \alpha' \leq \alpha + 0.003 * D_o^2$, at block 308. In one embodiment, a factor of 0.003 may be used to determine an acceptable tolerance, while other values may be used in other calculations. If the area reduction (α′) is determined to be within the acceptable tolerance at block 310, then the current central angle (θ) may be determined as the central angle (θ) for the segments to be inserted into the meter body to achieve the desired Reynolds number.

The height (h) of the segments may then be calculated based on the determined central angle (θ) using Equation 3 above: $h = (D_o/2) * [1 - \cos(\theta/2)]$, at block 312. If the area reduction (α′) is not determined to be within the acceptable tolerance at block 310, then a determination may be made whether the central angle (θ) is less than or equal to the minimum allowed central angle (θ) ($\theta_{min}$), at block 314. If the central angle (θ) is less than or equal to $\theta_{min}$, then processing may proceed to block 312, where a height (h) of the segments may be determined using Equation 3 as described above. If the central angle (θ) is not less than or equal to $\theta_{min}$, then the central angle (θ) may be decreased by 0.5 degrees to correct an overestimation of the central angle (θ), and processing may return to block 304, where the area reduction (α′) may be determined based at least in part on the adjusted central angle (θ). In this way, processing may continue in iterative fashion in which the estimated central angle (θ) may be adjusted upward or downward by some value until a suitable central angle (θ) may be determined.

The above example in FIG. 3 is for purposes of illustration and is not meant to be limiting. Different values, calculations, tolerances, etc., may exist in other embodiments.

Figure 4:
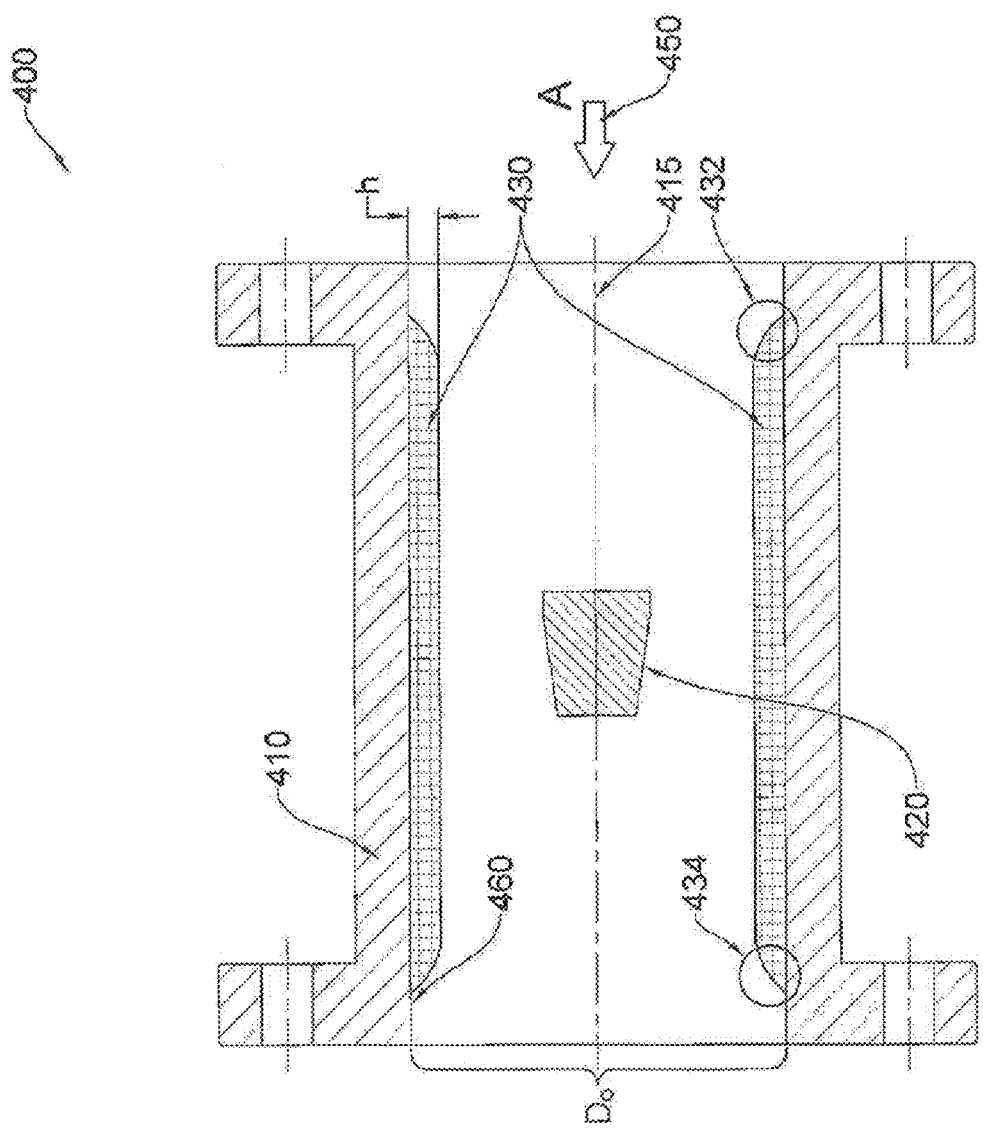
FIG. 4 illustrates an example configuration in which peripheral segments are inserted into the conduit portion of a Vortex flowmeter according to a certain size to meet a desired Reynolds number, according to an embodiment of the disclosure.

For purposes of illustration, the equations and the logic of FIG. 3 may be applied to the configuration of FIG. 4. For example, the segments 430 may be inserted into the conduit portion 460 of the meter body 410 to meet a desired Reynolds number. In one embodiment, the shedder bar 420 and the segments 430 may respectively be embodied by the shedder bar 120 and the segments 130 in FIG. 1.

In the present example, it is assumed that a 6-inch conduit ($D_o$) experiences a Reynolds number (Re) of 12,750 (Re number herein may be based on the conduit diameter $D_0$ as in Relation A2). If it is desired to increase Re to 15,000, the size of the segments 430 may be determined using the following calculations from Equations 1, 2, and 3 and the flow diagram of FIG. 3.

Applying Equation 1 to the present example, $Re_1$ may be proportional to 12,750, $a_1$ may be the area of the 6 inches conduit, and $Re_2$ may be proportional to 15,000. The value for $a_2$ may therefore be calculated as follows:

$$a_2 = (12,750/15,000) * a_1$$

The required area reduction to reach the desired Reynolds number may be determined as follows:

$$\alpha = a_1 - a_2, \text{ which after substituting the calculation for } a_2 \text{ yields:}$$

$$\alpha = a_1 * [1 - (Re_1/Re_2)]$$

The cross-sectional area $a_1$ corresponding to the current or initial Re value of 12,750 (for example, before segments are inserted into the conduit portion 460 of the meter body 410) and the area reduction (α) may be calculated for both segments 430:

$$a_1 = \pi * D_o^2/4, \text{ which after substituting into the above equation for } a_1 \text{ yields:}$$

$$\alpha = \pi * D_o^2/4 * [1 - (Re_1/Re_2)]$$

In the present example, the area reduction (α) therefore equals:

$$\alpha = 3.14 * 6^2/4 * [1 - (12,750/15,000)] = \text{approximately } 4.24 \text{ square inches}$$

Based at least in part on the area reduction (α) and the flow diagram of FIG. 3, the central angle (θ) may be determined for both segments 430 to be 84 degrees. Based at least in part on the central angle (θ) of 84 degrees, the height (h) of the arced segments may be calculated as follows using Equation 3:

$$h = (6/2) * [1 - \cos 42] = \text{approximately } 0.78 \text{ inches.}$$

In the present example, the central angle (θ) of 84 degrees and the height (h) of 0.78 inches may indicate the size of the segments 430 that may achieve a Reynolds number of 15,000 in the present example.

In FIG. 4, segments 430 may include a leading edge 432 and a trailing edge 434. The leading edge 432 may be configured to accelerate fluid flow. Vortices generated at least in part by the shedder bar 420 may mature at a location downstream of the shedder bar 420. Thus, in one embodiment, as fluid flows in the direction of the arrow 450, the fluid may encounter leading edges 432 that may accelerate the fluid into the shedder bar 420, which may generate alternating vortices off of the frontal edges of the shedder bar 420. Linearity of the Vortex flowmeter may be facilitated by the uniform extension of the peripheral segments 430 on the downstream side of the shedder bar 420 before the edges taper down in streamlined fashion to form the trailing edges 434. The leading and trailing edges may minimize pressure drop, while the uniform middle portion of the segments 430 may allow vortices to mature and interact without or with relatively little downstream disturbances.

In one embodiment, the leading 432 and/or trailing 434 edges may have angles that do not exceed 30 degrees as measured from the conduit portion wall 460 of the meter body 410. An angle for the leading edge 432 that is not greater than 30 degrees may enable the fluid flowing through the conduit portion 460 to stay attached to the surface of the segments 430. An angle for the trailing edge 434 that is not more than 30 degrees may reduce flow detachment disturbance to the vortices as they mature and exit the downstream edge 434. A detachment of the flow at the leading 432 and/or the trailing 434 edges may result in additional pressure losses.

Figure 5:
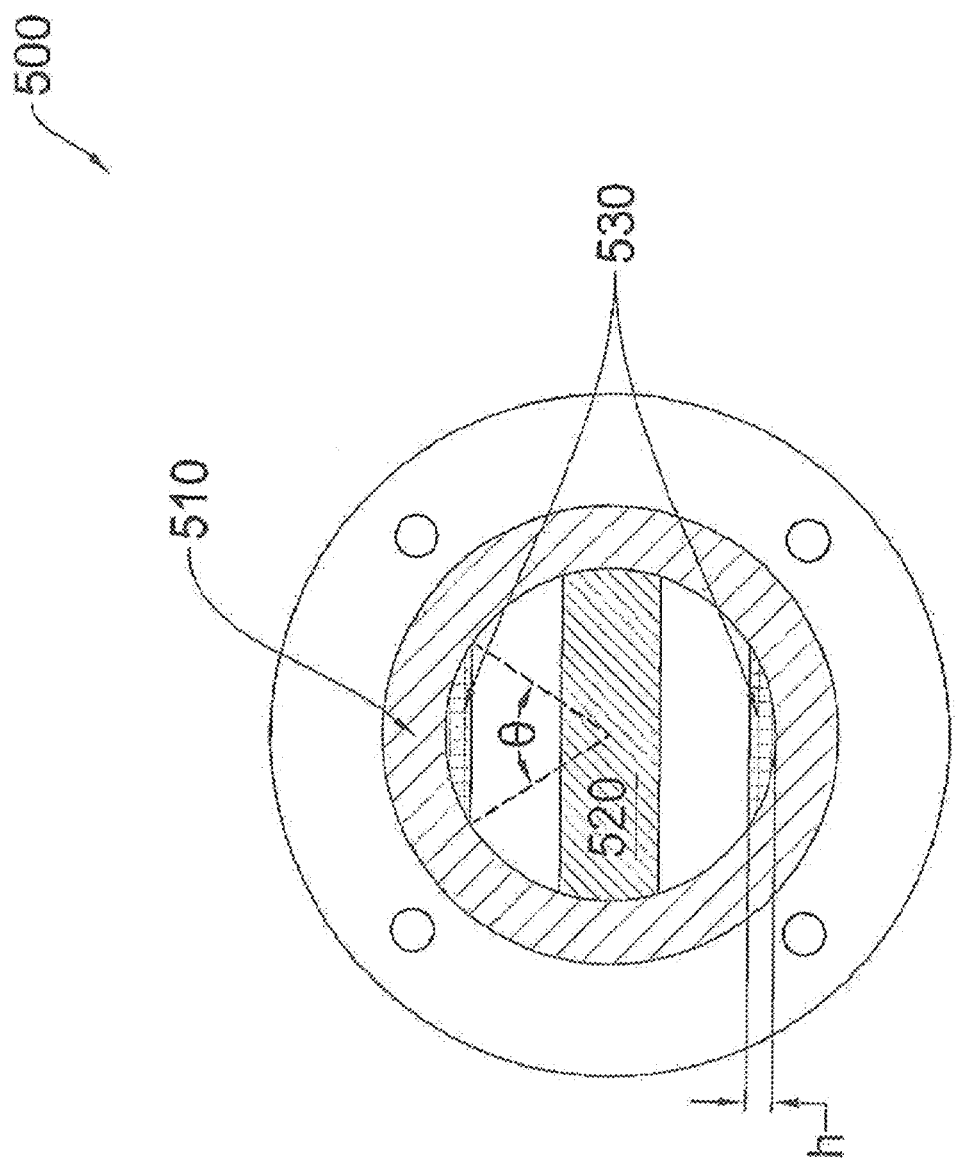
FIG. 5 illustrates a side view of the conduit portion of the meter body of the Vortex flowmeter of FIG. 4, according to an embodiment of the disclosure.

FIG. 5 illustrates the determined central angle (θ) and the height (h). As shown, the central angle (θ) represents the angle from the centerline of the meter body 510 to the exterior most portions of the segments 530. FIG. 5 illustrates a side view of the conduit portion of the meter body 410 of the Vortex flowmeter 400 in FIG. 4, according to an embodiment of the disclosure. As shown in FIG. 5, a shedder bar 520 may be parallel or substantially parallel to the peripheral segments 530.

Although the central angle θ and height (h) are shown for only one of the segments 530, the same measurements may apply to the other segment 530, in one embodiment. In other embodiments, the central angle (θ) and height (h) for the segments 530 may differ. In one aspect of these embodiments, the central angle (θ) and height (h) for both segments may be within acceptable tolerance levels, albeit having different values. The size of the segments 530 (for example, the central angle (θ) and the height (h)) may be determined such that the size of the segments 530 does not interfere or disturb the vortices generated via vortex shedding provided by the shedder bar 520, in one embodiment. This may set the criterion for the value of $\theta_{max}$. As previously described, the segments 530 may be parallel or substantially parallel to the shedder bar 520. In one configuration, of the segments 530 may be parallel to the shedder bar 520 within a tolerance of +/− (plus or minus) 5 degrees.

Figure 6:
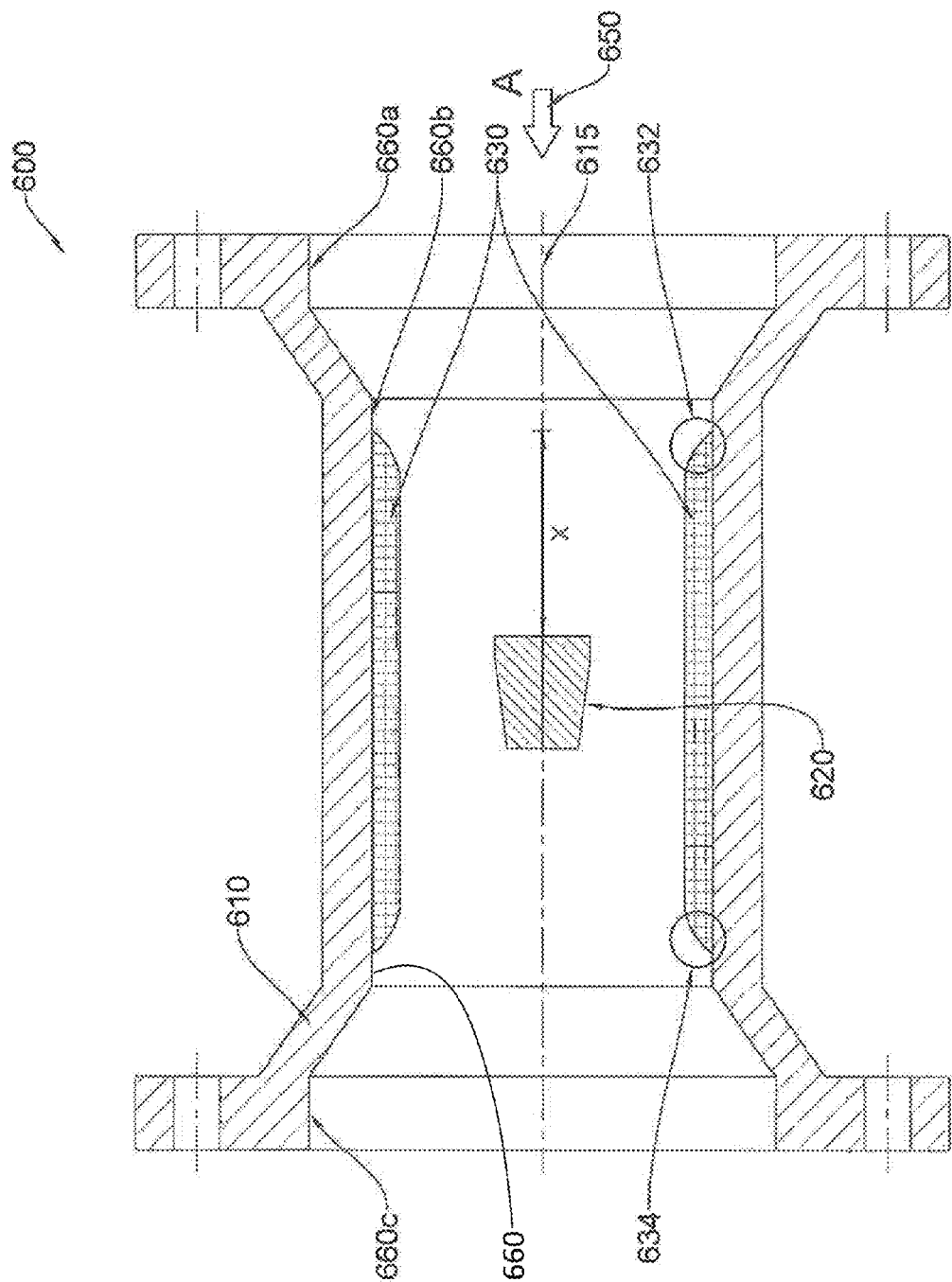
FIG. 6 illustrates a Vortex flowmeter in which both the conduit bore reduction and the peripheral segment insertion area reduction techniques are applied to achieve a minimum Reynolds number, according to an embodiment of the disclosure.

FIG. 6 depicts a Vortex flowmeter 600 in which both the meter conduit bore reduction and the peripheral segment insertion techniques are applied to achieve a larger Reynolds number increase, according to an embodiment of the disclosure. In one embodiment, the conduit bore reduction technique may be first applied, and to avoid reducing the size of the bore diameter too much, segments may be inserted into the conduit portion 660b of the meter body 610 to minimize the pressure drop. In another embodiment, the step conduit bore reduction technique may be implemented in response to determining that the central angle (θ) for the segments 630 exceeds a maximum allowable $\theta_{max}$ (such as 105 degrees in one embodiment). An example of using both area reduction techniques may be as follows.

As shown in FIG. 6, the Vortex flowmeter 600 may include, among other components, a meter body 610, a shedder bar 620, and segments 630. Fluid may flow through the conduit portion 660 of the meter body 610 from an upstream location to a downstream location in the direction indicated by the arrow 650. In certain embodiments, the meter body 610, the shedder bar 620, and the segments 630 may be embodied by the same components in FIGS. 1 and 4.

In the current example, it is assumed that the current Reynolds number (Re based on the conduit diameter $D_o$ as in Relation A2) is 9,500 for the bore or conduit portion 660a having a diameter $D_o$ of 6 inches, and the minimum desired Reynolds number (Re) may be 15,000. A required area ($a_2$) may be calculated as follows:

$$a_2 = (9{,}500/15{,}000) * a_1$$

Upon substituting for $a_2$ to solve for the amount of segment area reduction (α), where $\alpha = a_1 - a_2$, $$\alpha = \pi * D_o^2 / 4 * [1 - (Re_1/Re_2)], \text{ which becomes}$$

$$\alpha = (\pi * 6^2)/4 * [1 - (9{,}500/15{,}000)], \text{ which yields}$$

$$\alpha \approx 10.46 \text{ square inches}$$

A central angle (θ) may be calculated based on the area reduction (α) of approximately 10.46 square inches. In one embodiment, such a central angle (θ) may be calculated using FIG. 3 in conjunction with Equation 2 as described above. The required central angle (θ) that meets the minimum Reynolds number of 15,000 in the present example may therefore be approximately 117.5 degrees. The height (h), using Equation 3, may therefore be approximately 1.44 inches. The calculated central angle (θ) and height (h) of the segments based on the present bore diameter of 6 inches may interfere with vortex shedding.

In one embodiment, to address the potential interference with vortex shedding, the conduit portion bore 660 of the meter body 610 may be reduced to facilitate achieving the desired Reynolds number. In conjunction with reducing the conduit bore, one or more segments 630 may be secured to the conduit portion 660 to minimize the pressure drop after the bore of the meter body 610 has been reduced, in one embodiment.

A Reynolds number (Re) based on the conduit diameter may be expressed as $Re = VD_o/\upsilon$ (in Relation A2). For a constant volume flowrate ($=\pi/4 * V \, D_o^2$), Reynolds number (Re) may be shown to be inversely proportional to the Conduit diameter $D_o$.

In the present example, a reduced bore may be determined using the following equations:

$$Re_2/Re_1 = D_{o1}/D_{o2} \quad \text{(Equation 4)}$$

where $Re_1$ is the current 9,500 Reynolds number for a 6″ conduit $D_{o1}$, and $D_{o2}$ is the required diameter for a minimum 15,000 Reynolds number $Re_2$. Determining the required diameter $D_{o2}$ of the bore meter body 610 based on Equation 4 yields:

$$D_{o2} = Do_1 * Re_1/Re_2, \text{ which yields}$$

$$D_{o2} = 6 * 9{,}500/15{,}000 = 3.8 \text{ inches}$$

If relying only on the bore diameter reduction, the size of the conduit bore 660 may be size stepped down to an available Vortex flowmeter having a suitable shedder bar size of 3 inches, in one embodiment. In certain embodiments herein, the reduced bore diameter of the conduit bore 660 may be stepped up to the next available Vortex flowmeter size, which may be 4 inches (for example, from 3.8 inches up to 4 inches). As will be shown below, segments may be secured to the conduit bore 660 of the meter body 610 in conjunction with the bore reduction to achieve the desired minimum Reynolds number of 15,000 in the present example, while minimizing pressure loss, which may be greater if the meter body 610 is size stepped down to the next available Vortex flowmeter of 3 inches.

Using Equation 4, a new Reynolds number $Re_2$ may be calculated based on the reduced bore of 4-inch diameter as follows:

$$Re_2 = Do_1 * Re_1/Do_2, \text{ which yields}$$

$$Re_2 = 6 * 9{,}500/4 = 14{,}250$$

Based on the bore diameter of 4 inches, the required amount of area reduction (α), where $\alpha = a_1 - a_2$ and $a_2 = (14{,}250/15{,}000) * a_1$, as described above, may be calculated as follows:

$\alpha = \pi * 4^2/4 * [1 - 0.95] =$ approximately 0.63 square inches. This value is the required amount of area reduction needed to achieve the desired minimum Reynolds number (Re) of 15,000.

Using Equation 2 in conjunction with FIG. 3, the central angle (θ) that meets the desired Reynolds number (Re) may be calculated to be approximately 57 degrees. The height (h), based on Equation 3 above, may be calculated to be approximately 0.25 inches.

Turning back to FIG. 6, the bore reduction of the meter body 610 and the addition of the segments 630 are illustrated. An inlet bore 660a may be the point at which a relatively large conduit pipe (in the present example, the inlet bore 660a may correspond to the pipe diameter ($D_{o1}$) of 6 inches) which may correspond to a Reynolds number (Re) of 9,500. The bore reduction in the present example may be illustrated by the smaller bore 660*b*, which may correspond to a 4-inch diameter that was obtained after stepping up from the calculated 3.8-inch diameter. The inlet bore 660*a* may converge into the smaller bore 660*b* in the central section of the meter body 610, where the shedder bar 620 and the segments 630 may be parallel or substantially parallel to one another.

The segments 630 may be inserted into the meter body 610 to achieve the desired minimum Reynolds number (Re) after the bore reduction, in the present example. The segments may have a central angle ($\theta$) and a height (h), based at least in part on the calculations above, that meet the minimum desired Reynolds number (Re) of 15,000.

Further according to FIG. 6, the location (X) of the shedder bar 620 may vary. In one embodiment, the shedder bar 620 may be located along a central plane 615 at a location that is approximately central to the segments 630. In another embodiment, the shedder bar 620 may be fixed at a location that is closer to the upstream end than the downstream end to facilitate generating stable vortices that may mature on the downstream side beyond the shedder bar 620.

As fluid flows in the direction of the arrow 650, the fluid may be accelerated as the bore diameter 660*a* decreases to 660*b*. Then, the flow may encounter leading edges 632 of the peripheral segments 630 that may further accelerate the fluid into the shedder bar 620, which may generate alternating vortices off of the frontal edges of the shedder bar 620. Linearity of the Vortex flowmeter may be facilitated by the uniform extension of the peripheral segments 630 on the downstream side before the edges taper down in a streamlined fashion to form the trailing edges 634. The leading and trailing edges may minimize the pressure drop, while the uniform middle portion of the segments 630 may allow the vortices to mature and interact without or with relatively little downstream disturbances. In one embodiment, the leading and trailing edges in FIG. 6 may be the same or similar to the leading and trailing edges in FIG. 4 described above.

Fluid flowing downstream may leave the central section 660*b* of the conduit portion 660 and enter an outlet section 660*c*. The conduit bore of the Vortex flowmeter configuration 600 may increase at the outlet section 660*c* such that it matches the inlet bore 660*a* diameter, in one embodiment. The outlet section 660*c* may include a diffuser to match the conduit pipe diameter, while maintaining a face-to-face length that is the same as that of the Vortex flowmeter, in one embodiment.

The above configurations associated with FIG. 6 are for purposes of illustration and are not meant to be limiting. Variations may exist. For example, some configurations may include a relatively thinner shedder bar 620 that may fit the space between the parallel segments 630. According to these configurations, the central angle ($\theta$) may exceed 105 degrees. The central angle ($\theta$) may therefore depend on the width of the shedder bar 620, in some embodiments.

Figure 7:
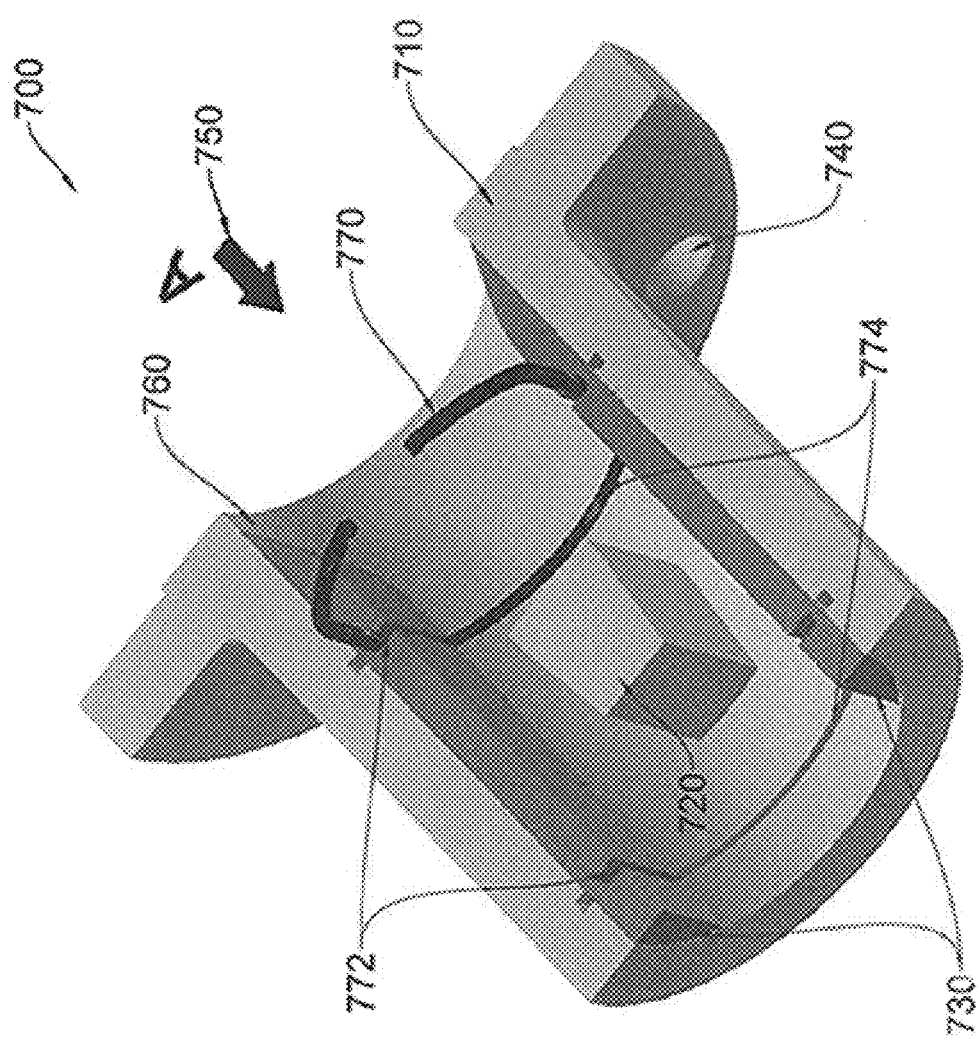
FIG. 7 illustrates a Vortex flowmeter that includes replaceable peripheral segments, according to an embodiment of the disclosure.

FIG. 7 depicts a Vortex flowmeter 700 that includes one or more replaceable segments 730, according to an embodiment of the disclosure. In one embodiment, one or more retaining rings 770 may secure one or more of the segments 730 to the conduit portion 760 of the meter body 710 such that the segments 730 are parallel or substantially parallel to the shedder bar 720. As shown in FIG. 7, retaining rings 770 may secure both peripheral segments 730 at an upstream location and/or a downstream location. Grooves 772 of the segments and the conduit portion grooves 774 may facilitate replacement of the segments 730 by allowing the retaining rings 770 to be applied and removed. In this way, the retaining ring 770 may be described as forcing, restraining, retaining, etc., the peripheral segments 730 in place against the conduit portion bore 760 of the meter body 710, but such restraint may be released to free the segments 730, in certain embodiments herein. In some embodiments, the replaceable peripheral segments 730 may be used in situations in which flow conditions, operational conditions, or other conditions have changed or are expected to change.

As mentioned, the grooves 772 and 774 may facilitate securing the segments 730 by housing at least a portion of the retaining ring 770. As shown, the grooves 772 may exist in the segments 730. The grooves 774 may exist in the body of the conduit potion 760 and may be aligned with the grooves 772 to facilitate housing of the retaining ring 770. In one embodiment, the grooves 772 and 774 may be machined into the segments 730 and the conduit bore 760, respectively. The grooves 772 may have a depth in the segment 730 that may be suitable for the smallest central angle ($\theta$) of 50 degrees, in one embodiment. In this way, as fluid flow conditions change, the retaining ring 770 may remain the same size irrespective of the size or dimensions of the segments 730 that may be secured to the conduit portion 760 of the meter body 710. In some embodiments, the grooves 772 and 774 may be relatively thin and may include a depth that causes relatively small disturbances on the upstream side that may be sufficient to stimulate the shear layer hydrodynamic instability to facilitate vortex shedding. The grooves 772 and 774 may also be designed to house the retaining ring 770 such that it does not disturb the fluid flow, which may minimize pressure drop, in some embodiments.

FIGS. 8A and 8B depict retaining rings and associated grooves that may accommodate different central angles ($\theta$). For example, FIG. 8A depicts a retaining ring 870 in a Vortex flowmeter 800A that secures peripheral segments 830 having a central angle ($\theta$) that may be equal to $\theta_{min}$. As shown in FIG. 8A, the grooves 872*a* in the segments 830 may be shallow in comparison to grooves 872*b* in FIG. 8B. Such depths may be relatively shallow as compared to the depths in FIG. 8B corresponding to segments having a central angle ($\theta_{max}$). In one embodiment, the grooves 872 and 874 may correspond to the grooves 772 and 774, respectively, in FIG. 7.

As shown in FIG. 8B, the Vortex flowmeter 800B may include grooves 872*b* and 874 in the segments 830 and the meter body 810 of the flowmeter 800B, respectively, for housing the retaining ring 830. As mentioned, the grooves 872*b* may be deeper than the grooves 872*a* to support segments having a larger central angle ($\theta$). The body grooves 874 and the retaining rings 870 may remain the same or approximately the same notwithstanding the change in the central angle ($\theta$), in one embodiment.

Any of the above descriptions for reducing the flow area of a conduit portion of a meter body may be implemented independently or in conjunction with at least one other technique. A particular technique for reducing flow area may correspond to certain conditions in the operation of a Vortex flowmeter, the environment in which the Vortex flowmeter operates, or any number of circumstances. For example, in situations in which the operations of the Vortex flowmeter are stable and a minimum flow rate is known and fixed, then a Vortex flowmeter may be developed at a manufacturing facility before it is installed in the field. For example, segments with a particular central angle ($\theta$) and height (h) based at least in part on the known flow rate may be machined and welded, secured, attached, etc., to the meter body conduit wall.

According to another condition, such as when changes in the operation of the Vortex flowmeter or the start-up conditions are known, replaceable segments may be used. As described above, retaining rings may be used to secure segments to the meter body conduit walls and may enable replacement of the segments without the need to change the flowmeter itself. In one embodiment, segment sizes (for example, the central angle (θ) and the height of the segments (h)) may be calculated and machined, including the grooves for housing the retaining rings. One or more wet calibrations may be conducted (for example, at least one for each segment insertion size) for the condition when changes in the operation of the Vortex flowmeter or the start-up conditions are known, in certain embodiments.

According to another condition, such as when changes in operating conditions are expected but unknown, the meter body may be prepared with grooves for retaining rings, and may be wet calibrated for shipping with or without segments to be changed in the field. After the change is determined, a new segment size (central angle (θ) and height (h)) may be determined and machined with grooves for retaining rings. A wet or dry calibration may be performed according to various circumstances.

According to another condition, such as when changes are unanticipated in operating conditions, the Vortex flowmeter subjected to the changes may be removed from the line and fitted with suitable area reducer segments as described above. The segments may be welded to the meter body or may be machined with grooves for housing one or more retaining rings for securing the segments against the meter body, as described above. A wet or a dry calibration may be performed at the time of such modification.

A wet calibration of a vortex flowmeter may require placing the flowmeter in a calibration loop to determine the K-factor (which may be referred to as the number of vortex pulses per unit flow volume through the conduit portion) and the linearity. The linearity may indicate a constant Strouhal Number (which may be referred to as a dimensionless number describing oscillating vortex flow mechanisms.

The Strouhal number may be given as $St=fd/V$,
where f is the frequency of vortex shedding.
d is the characteristic length (see, FIG. 2), and
V is the velocity of the fluid.

Wet calibrations may be expensive and time consuming, for example, when it is performed after each peripheral segment change.

A dry calibration may be performed without placing the vortex flowmeter in a flow calibration loop, in one embodiment. A dry calibration may rely on empirical dimensional data or on calculations based on the Reynolds number and a known K-factor value for a flowmeter before peripheral segments are added or changed. As an example:

$K$-factor=(Number of Pulses)/(Unit Volume), wherein dividing both the numerator and the denominator by time yields:

$K$-factor=(frequency of Pulses $f$)/(Volume flowrate), whereby for an optimized linear flowmeter (St number is constant), the frequency f is proportional to flow velocity V.

On the other hand, the volume flow rate=V*the conduit cross-sectional area.

Thus, the relation between the K-factor and the area may be:

$K_1/K_2 = a_2/a_1$, whereby $K_2 = K_1 \times (a_1/a_2)$ (referred herein to as Relation A3)

Where $K_1$ may be the established K-factor value for the flowmeter with conduit cross-sectional area $a_1$ and $K_2$ may be the new K-factor that resulted from inserting different peripheral segments to reduce the conduit bore cross-sectional area down to $a_2$. $K_2$ is the new dry calibrated K-factor.

II. Flow Area Reduction in Vortex Ring Flowmeters Using Centralized Streamlined Bodies In some embodiments, the shedder bluff body may include a vortex ring generator. One configuration of such a shedder bluff body may include a relatively thin circular ring that may be centered in a circular flow conduit and may produce axisymmetric toroidal vortices whose frequency may be linearly proportional to the velocity of a fluid flow in the conduit. Such vortices may have relatively strong coherence, signal-to-noise ratio, stability, repeatability, and linearity, among other benefits. In one configuration, the relatively thin vortex ring generator may have a thickness that is the same or approximately the same as an orifice plate carrier. By virtue of a relatively higher vortex shedding frequency associated with a vortex ring generator having a relatively thin shape (for example, a vortex ring generator having a frontal thickness of approximately one-tenth of the diameter of a conduit portion of the meter body of a vortex ring flowmeter), a higher vortex shedding frequency (i.e. a higher K-factor) may be generated, and hence, a relatively higher meter resolution. A relatively thin shape of the vortex ring generator may also facilitate manufacturing larger meter sizes, for example, to approximately twenty-four inches in certain embodiments.

For axisymmetric vortex rings, axisymmetric flow area reduction configurations may be used. According to these configurations, a streamlined body having a generally torpedo shape (referred to generally herein as a torpedo) may be inserted within a bore or conduit of a meter body that includes a vortex ring generator, which will be described in greater detail below. In one embodiment, a torpedo may include a body placed at or near the centerline of the bore of the meter body. The torpedo may be axisymmetric and/or may include various shapes and/or sizes in various embodiments. The torpedo may be used, alone or in conjunction with another step bore reduction technique, to achieve an increased velocity and Reynolds number, and hence, optimized performance of Vortex ring flowmeters, as will be described in greater detail below.

Figure 9:
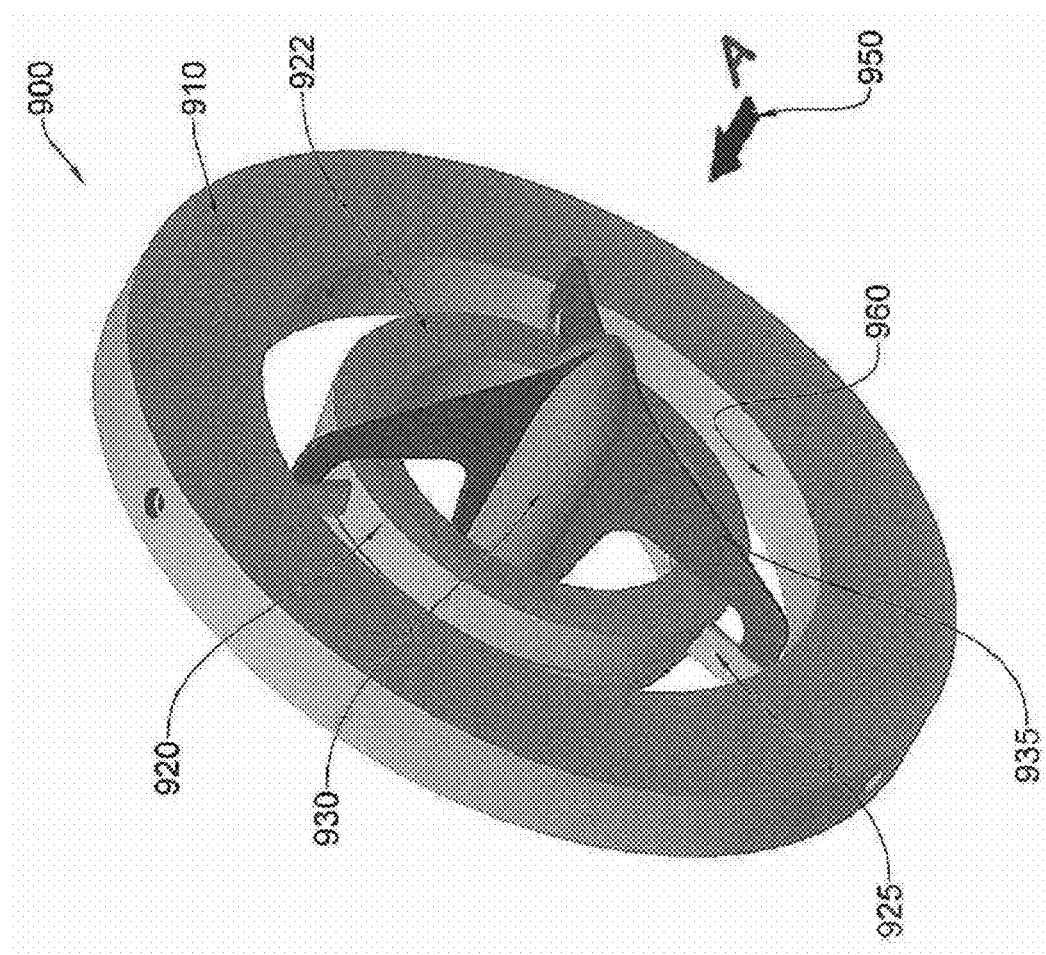
FIG. 9 illustrates a Vortex ring flowmeter that includes a central streamlined body for reducing the conduit portion flow area of the Vortex ring flowmeter, according to an embodiment of the disclosure.

FIGS. 9-16B are directed to this other type of Vortex flowmeter that includes a vortex ring generator. As described herein, a torpedo may be used in such Vortex flowmeters to reduce the flow area of the conduit of a meter body through which various types of fluid may flow. FIG. 9 depicts an example Vortex flowmeter 900 that includes a vortex ring generator 920, the combination of which may be referred to generally herein as a Vortex ring flowmeter 900. In addition to the vortex ring generator 920, the Vortex ring flowmeter 900 may also include, but is not limited to, a torpedo 930, one or more hanger plates 935 that may secure the torpedo 930 to a respective support 925 or directly to the conduit bore 960 in another embodiment. Each support 925 may secure the torpedo 930 and the vortex ring generator 920 to a meter body 910 of the Vortex ring flowmeter 900, in one embodiment. The meter body 910 may have a plate wafer body shape, for example, a relatively thin plate wafer body shape, in one embodiment. The meter body 910 may include a conduit or channel 960 through which fluid (for example, liquid, gas, a combination thereof, etc.) may flow, as shown by the arrow 950. The torpedo 930 may be disposed generally centrally within the vortex ring generator 920, which may be disposed within a conduit or channel 960 of the meter body 910.

As shown in FIG. 9, a vortex ring generator 920 may have a generally circular or donut shape appearance, in one embodiment. The vortex ring generator 920 may cause, induce, or otherwise generate toroidal vortices as a result of fluid (for example, liquid, gas, high-temperature steam, any combination thereof, etc.) traveling through a conduit or channel 960 of the meter body 910. The toroidal vortices generated by the vortex ring generator 920 may have a frequency that is linearly proportional to a velocity of the fluid flowing through the conduit. In certain embodiments, other conduit portion 960 and vortex ring generator 920 shapes, like oval or rectangular, may be utilized.

In certain embodiments, the vortex ring generator 920 may be located at the center or approximate center of the conduit 960. A central longitudinal axis of the vortex ring generator 920 may be aligned or approximately aligned with a central longitudinal axis of the conduit 960 in the direction of fluid flow 950 consistent with such central location, in one embodiment. One or more supports 925 may secure the vortex ring generator 920 to the meter body 910. For example, each support 925 may be a planar or substantially planar member and may have a first end coupled to an annular outer surface of the vortex ring generator 920 and an opposing, distal second end coupled to an inner conduit surface 960 of the meter body 910. Further, the leading edge of each support 925 may be curved and generally thinner than the trailing edge of each support 925. Although three supports 925 are shown in FIG. 9, fewer or more may exist in other configurations. In one embodiment, the meter body 910 may be a plate wafer body, which may be as thin as an orifice plate carrier as mentioned above, in one embodiment. To facilitate the coupling of each support 925 to the vortex ring generator 920 and/or the meter body 910. The supports 925 may be attached to the meter body 910 and/or the vortex ring generator 920 via one or more welds, screws, bolts, adhesives, other fasteners, or other attachment mechanisms. In one embodiment, the entire assembly (body 910, ring generator 920, supports 925, torpedo 930 and hanger plates 935) may be cast or molded as one piece. One or a combination of such attachment mechanisms may facilitate securement of the torpedo 930 to the meter body 910 in various configurations. In some configurations, the supports 925 may include one or more grooves, slits, or openings for receiving another body, such as a portion of a hanger plate 935, as will be described in greater detail below.

The torpedo 930 may be located at or near a central longitudinal axis with regards to the fluid flow 950 of the conduit portion 960 of the meter body 910, which may also be the central longitudinal axis of the vortex ring generator 920 or the centerline of the meter body 910, in one embodiment. In certain embodiments, the torpedo 930 may have an elongated cylindrical or substantially cylindrical body with streamlined ends. In certain configurations herein, the torpedo 930 may be an axisymmetric streamlined body having leading and trailing edges for facilitating vortex shedding, as will be described in greater detail below. The torpedo 930 may also be referred to as an axisymmetric reducer in the way it reduces the flow area along a generally central portion of the conduit 960 associated with the meter body 910 of the Vortex ring flowmeter 900. The torpedo 930 may include various other shapes or configurations in other embodiments.

As shown in FIG. 9, at least a portion of the torpedo 930 may extend beyond a frontal face 922 of the vortex ring generator 920 and a second opposing side (not visible) of the vortex ring generator 920 such that a first portion of the torpedo 930 is located on the upstream side of the meter body 910, while a second portion of the torpedo 930 is located on the downstream side of the meter body 910. As used herein, the upstream side of the meter body 910 may refer to the area of the meter body 910 that encounters fluid flow before the fluid contacts the vortex ring generator 920, while the downstream side of the meter body 910 may refer to the area of the meter body 910 after the fluid moves past the vortex ring generator 920.

One or more hanger plates 935 may secure the torpedo 930 in position. Although three hanger plates 935 are shown attached to a respective support 925, fewer or more hanger plates 935 may exist in other configurations. The hanger plates 935 may be relatively thin and may have streamlined leading and trailing edges. Such hanger plates 935 located on the upstream side of the vortex ring generator 920 may be beneficial in stimulating the shear layer hydrodynamic instability responsible for creating the vortex shedding.

According to one configuration, a first end of a hanger plate 935 may be attached to the torpedo 930 and a second, distal end of the hanger plate 935 may be attached to a support 925. In one embodiment, the torpedo 930 and the support 925 may include a groove, a slit, or other opening for receiving the first end and the second end, respectively, of the hanger plate 935. As will be described in greater detail below, such a configuration may facilitate changing the torpedo 930 as the fluid flow or other conditions change. In various embodiments, the hanger plates 935 may be welded, bolted, screwed, or otherwise fastened to the torpedo 930 and the support 925. In one embodiment, the hanger plates 935 may be attached directly to a meter body 910 instead of being attached to a support 925 via one or more welds, screws, bolts, adhesives, or other attachment mechanisms. The hanger plates 935 may also be attached to one or more surfaces of the meter body conduit portion 960 or a flow conduit through which fluid may flow, in other embodiments.

FIG. 10A depicts a cross-sectional view of an example Vortex ring flowmeter 1000 that is a slim wafer or otherwise a plate wafer body. The Vortex ring flowmeter 1000 may embody the Vortex ring flowmeter 900 of FIG. 9, in one embodiment. As shown in FIG. 10A, a torpedo 1030 may be secured in position via hanger plates 1035, which may include a first end attached to the torpedo 1030 and a second end attached to the support 1025. A first end of the support 1025 may be attached to the conduit portion 1060 of the meter body 1010, and a second opposing end of the support 1025 may be attached to the vortex ring generator 1020, as shown. Such a configuration is also illustrated in FIG. 10B, which is a topographical view of the configuration shown in FIG. 10A. As shown in FIG. 10B, in one embodiment, a portion of the hanger plate 1035 may be disposed within the support 1025, which may secure the hanger plate 1035 at a first end. As will be described in greater detail below, the support 1025 may include a groove or slot for facilitating such coupling. A second end of the hanger plate 1035 may be secured to the torpedo 1030. Further as shown, the support 1025 may be disposed between and adjacent to both the vortex ring generator 1020 and the meter body 1010, in one embodiment. In another embodiment, the hanger plates 1035 may be in different planes from those of the supports 1025 and may be attached to the conduit portion 1060.

Returning to FIG. 10A, the hanger plates 1035 may be mounted to the torpedo 1030 at an upstream and/or downstream location in the meter body 1010 in various embodiments. In one embodiment, the hanger plates 1035 may be mounted only on the upstream portion of the meter body 1010, which may be the portion of the meter body 1010 before fluid flowing in the direction indicated by the arrow 1050 moves past the vortex ring generator 1020. Such a mounting may enable the toroidal vortices to be more stable since the downstream portion of the meter 1000 may have more influence than the upstream portion on the stability of the toroidal vortices.

At least a portion of the hanger plates 1035 may be secured to or may otherwise contact at least a portion of the conduit portion 1060 of the meter body 1010, as shown. Such an arrangement may provide additional stability to the torpedo 1030. The hanger plates 1035 may also be separated from the vortex ring generator 1020 by a gap ($x_1$) as shown. In other embodiments, at least a portion of the hanger plates 1035 may be attached to or otherwise contact the vortex ring generator 1020 to provide additional stability to the vortex ring generator 1020 and/or the torpedo 1030. As mentioned, the hanger plates 1035 may have leading and trailing edges 1036 and 1038, respectively, to facilitate vortex shedding as described herein.

As mentioned, the The torpedo 1030 may include a leading nose 1032 and a trailing nose 1034, in one configuration. As used herein, a nose, whether leading or trailing, may include an angular portion or end extending therefrom may be a first and a second arced edge. A distance between the first and second arced edges may increase as the arced edges extend until they encounter the central body portion of the torpedo, in one configuration. As fluid flowing in the direction indicated by the arrow 1050 contacts the leading nose 1032, the fluid may be accelerated before it contacts the vortex ring generator 1020. The vortex ring generator 1020 may generate alternating toroidal vortices off the frontal outer and inner circles. In one embodiment, the torpedo 1030 may have uniform extension on the downstream side past the vortex ring generator 1020 before it tapers down in a streamlined fashion to form the trailing nose 1034. Such a configuration may facilitate an undisturbed interaction between the oppositely rotating toroidal vortices to enable linearity of the Vortex ring flowmeter 1000. The streamlined leading nose 1032 may also reduce pressure drop.

A cross-sectional view of an example Vortex ring flowmeter having a flanged meter body is shown in FIG. 11A. As shown, a Vortex ring flowmeter 1100 may have a flanged meter body 1110. The flanged meter body 1110 may include one or more bolt holes 1140 (as shown in FIG. 11B) for connecting the flanged meter body 1110 to a similar, opposing, or like flange (for example, via bolts, screws, fasteners, or other attachment mechanisms), in one embodiment. Fluid may flow through the conduit portion 1160 as indicated by the arrow 1150.

Also as shown in FIG. 11A, a torpedo 1130 may be secured to the flanged meter body 1110 via hanger plates 1135. Although two hanger plates 1135 are shown, fewer or more may exist in other configurations. In one configuration, at least one hanger plate 1135 may be located on an upstream side and a downstream side of the flanged meter body 1110. According to this embodiment, at least one hanger plate 1135 may be located at a location relatively further downstream such that the at least one hanger plate 1135 may not interfere with the interaction of matured toroidal vortices. In one embodiment, a first end of the torpedo 1130 may be attached to a hanger plate 1135 on the upstream side, while a second opposing end of the torpedo 1130 may be attached to a hanger plate 1135 on the downstream side. In one configuration, the torpedo 1130 may include one or more grooves or slots for receiving and securing the hanger plates 1135, as will be described in greater detail below. One or more welds, bolts, screws, adhesives, or other attachment mechanisms may also be used to secure the torpedo 1130 to the hanger plates 1135 in various embodiments. One or more of such attachment mechanisms may also be used to secure the hanger plates 1135 to the conduit portion 1160.

The torpedo 1130 may be disposed within a vortex ring generator 1120, which may be secured to the conduit portion 1160 via supports 1125, as shown. In one configuration, the length of the uniform section of the torpedo 1130 (for example, the section or portion between the leading nose section 1132 and the trailing nose section 1134) may be equal to or less than one full bore diameter ($D_o$) of the meter body conduit. Torpedoes 1130 of varying lengths and sizes may be used in other configurations.

FIG. 11B may illustrate a topographical view of the components of the flanged Vortex ring flowmeter 1100 in FIG. 11A, in addition to the bolt holes 1140 described above, in one embodiment, the components in the Vortex ring flowmeter 1100 may be embodied by like components in the Vortex ring flowmeters 900 and 1000 in FIG. 9 and FIG. 10A, respectively.

Figure 12:
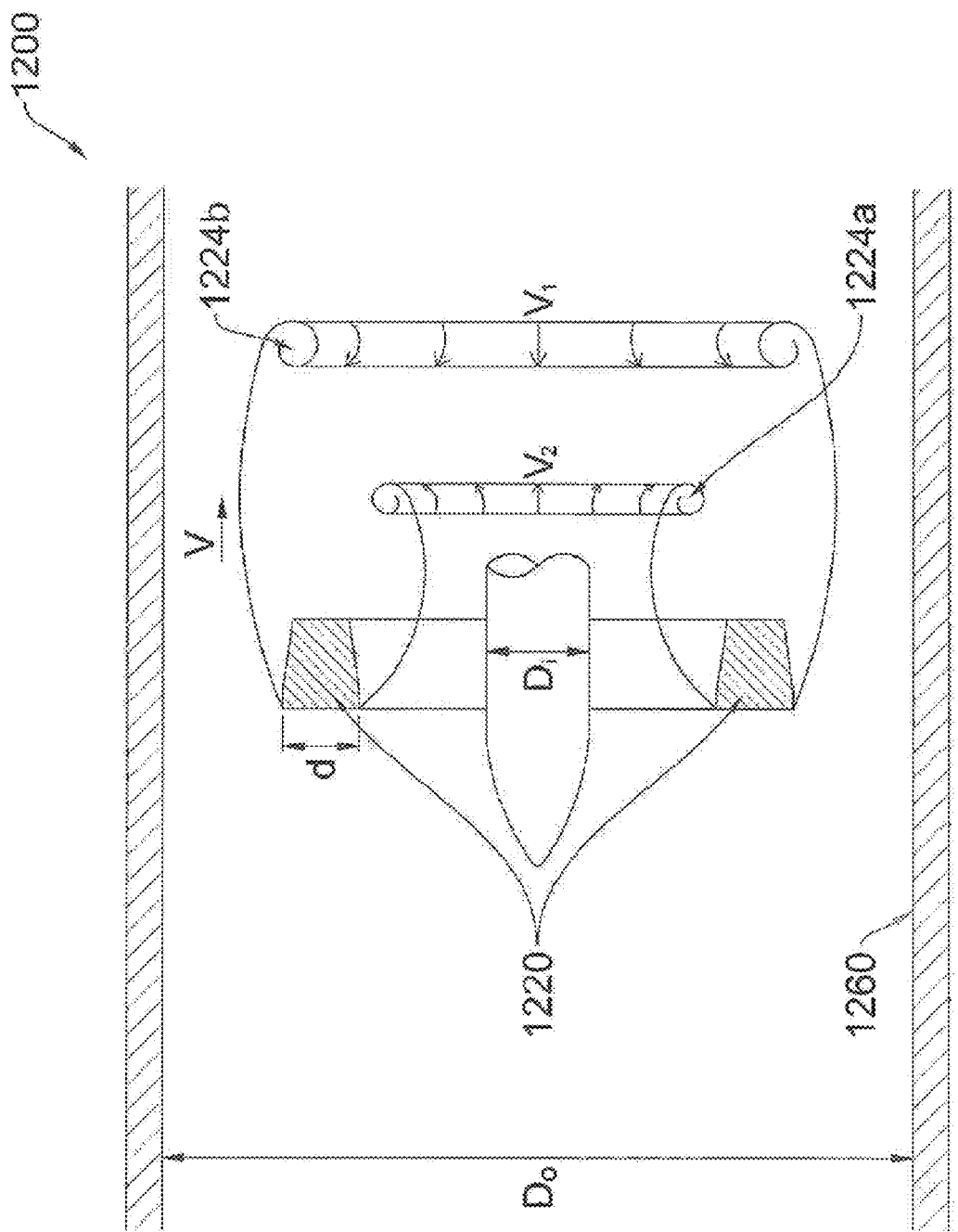
FIG. 12 illustrates components of a Vortex ring flowmeter and associated variables that may be used to determine a conduit portion area reduction to meet a minimum desired Reynolds number, according to an embodiment of the disclosure.

FIG. 12 depicts a cross-sectional view of a vortex ring generator 1220 of a Vortex ring flowmeter 1200 and variables associated with fluid flowing through the Vortex ring flowmeter 1200. For example, oppositely rotating toroidal vortices 1224a and 1224b may be generated as a result of fluid passing by the vortex ring generator 1220. The flow velocity (V), the vortex ring generator 1220 frontal face (d), and the torpedo 1230 diameter ($D_t$) as well as other parameters may be used to calculate a certain diameter of a torpedo to reduce the flow area of fluid flowing through the conduit portion 1260 of the Vortex ring flowmeter.

In certain embodiments, Reynolds number (Re) calculations may be based on fluid flow around a body, such as the vortex ring generator 1220 in FIG. 12. The calculation, of Reynolds number (Re) (based on the ring face width d), for such fluid flow may be as follows:

$$Re = Vd/\upsilon \text{ (referred to herein as Relation B1)}$$

where Re is the Reynolds number based on the ring face width (d), where V is the velocity of the fluid flow, where $\upsilon$ is the kinematic viscosity of the fluid, and where d is the frontal face width of the vortex ring generator 1220.

Since an introduction of a torpedo of diameter $D_t$, at the center of the ring 1220, may only increase the velocity V (Relation B1), a relationship between the Reynolds number and a diameter of a torpedo $D_t$ may be as follows:

$$Re_1/Re_2 = V_1/V_2 = (D_o^2 - D_{t2}^2)/(D_o^2 - D_{t1}^2) \text{(referred to herein as Equation 5)}$$

where $D_o$ is the diameter of the meter body conduit, where $Re_1$ and $V_1$ are respectively the initial Reynolds number and velocity corresponding to an initial condition represented by the torpedo diameter $D_{t1}$, and where $Re_2$ and $V_2$ are respectively the Reynolds number and velocity associated with a condition represented by a torpedo of a different diameter $D_{t2}$.

If no torpedo exists in the initial condition ($D_{t1}=0$), then Equation 5 may be reduced to:

$$D_{t2}^2 = D_o^2 * (1 - Re_1/Re_2) \text{(referred to herein as Equation 6)}$$

The Reynolds number (Re) may also be based on the conduit diameter $D_o$ (similar to Relation A2 in Section I). The value of the Reynolds number (Re) based on the ring frontal face width (d) and the Reynolds number (Re) based on the conduit diameter ($D_o$) may differ in value, however, they are proportional. Accordingly, in certain embodiments herein, Reynolds number (Re) may be referred to as Re without specifying that it is based on the conduit diameter.

In one example, the diameter of a torpedo ($D_{t2}$) for increasing the Reynolds number from 12,750 to 15,000 for fluid flowing through a conduit portion $D_o$ of 6 inches may be calculated as follows based on Equation 6.

$$D_{i2}^2=6^2*(1-(12,750/15,000))=5.4 \text{ inches}^2,$$
$$D_{i2}=\text{approximately 2.32 inches.}$$

Figure 10:
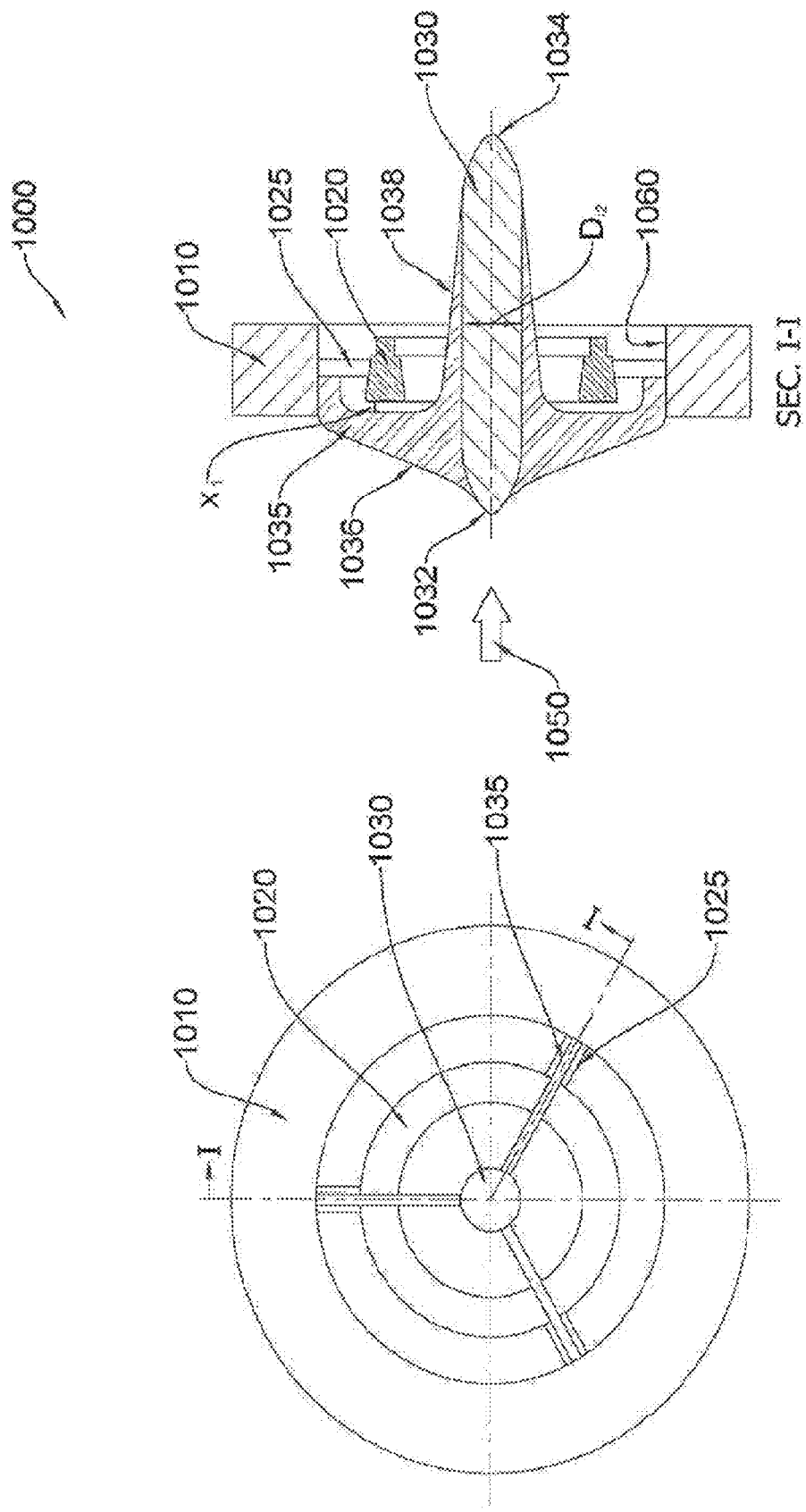
FIG. 10A illustrates a cross-sectional view of a central streamlined body mounted to a Vortex ring flowmeter, according to an embodiment of the disclosure.
FIG. 10B illustrates a topographical view of the central streamlined body in FIG. 10A, according to an embodiment of the disclosure.
Figure 11:
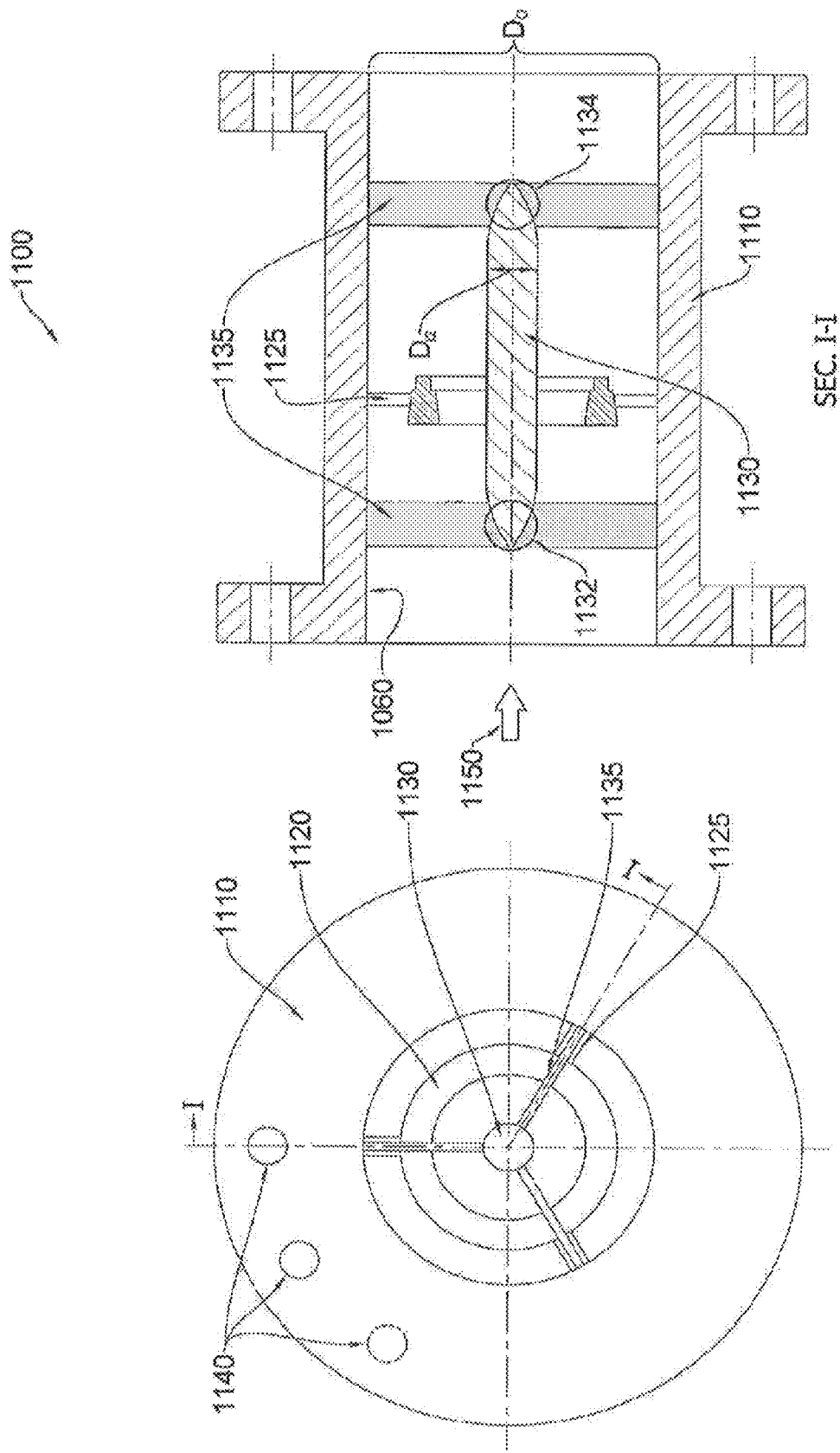
FIG. 11A illustrates a cross-sectional view of a central streamlined body mounted to a flanged Vortex ring flowmeter, according to an embodiment of the disclosure.
FIG. 11B illustrates a topographical view of the components of the Vortex ring flowmeter in FIG. 11A, according to an embodiment of the disclosure.

Thus, according to the present example, a torpedo having a diameter of 2.32 inches may be inserted at or near the centerline of a meter body conduit to reduce the flow area of the conduit portion, and hence increase the velocity and Reynolds number of the fluid, to an optimized value of 15,000. Such a diameter of the torpedo is shown in FIGS. 10A and 11A as $D_{i2}$ and may represent the diameter of the widest portion of the torpedo, in one embodiment. By virtue of inserting the torpedo into a conduit portion, there may not be a need to step down the size $D_o$ of the meter body to the next available size (for example, four inches in the present example) and therefore experience an additional pressure drop as a result of having an undersized conduit portion. In this way, the torpedo may be used to achieve a precise Reynolds number without an additional pressure drop, in certain embodiments herein. As shown in FIGS. 10 and 11, the torpedo ($D_{i2}$) may be introduced at the center of an existing flowmeter without having to replace the meter.

According to another example, a diameter of a central torpedo $D_{i2}$ may be calculated to increase the Reynolds number from 9,500 to 15,000 for fluid traveling through a 6-inch conduit portion of a meter body. Using Equation 6 above yields a diameter of the torpedo as follows:

$$D_{i2}^2=6^2*(1(9,500/15,000))=13.2 \text{ inches}^2,$$
$$D_{i2}=\text{approximately 3.63 inches.}$$

A torpedo having a diameter of approximately 3.63 inches in a 6" conduit may interfere with vortex shedding by the vortex ring generator, and hence, may be too large in certain configurations herein. Whether the torpedo has a diameter that interferes with vortex shedding may be determined by comparing a ratio of the calculated torpedo diameter ($D_{i2}$) to the diameter of a meter body conduit ($D_o$), that is, $D_{i2}/D_o$.

In the present example, such a ratio may be approximately equal to 0.6 (that is, 3.63 inches/6 inches). In certain embodiments, a ratio that is greater than 0.4 (or other values in other examples) may indicate that the torpedo may be too large for insertion into the conduit portion of the meter. In such instances, for flanged flowmeters, the bore of the meter body conduit may be reduced, as will be described in greater detail below. In some embodiments, a vortex ring generator in the meter body may instead be resized to fit the annular space between the conduit diameter $D_o$ and the oversized torpedo diameter $D_{i2}$.

Returning to the above calculation in which the diameter of the torpedo was calculated to be 3.63 inches, the bore of the 6-inch flanged meter body conduit may first be reduced. Since the volume flowrate through the meter stays the same, to determine an amount to reduce the bore, the following equation may be used in one embodiment:

$$Re_2/Re_1=D_{o1}/D_{o2} \text{(referred to herein as Equation 7)}$$

where $Re_1$ is the initial Reynolds number, e.g., 9,500,
where $Re_2$ is the desired Reynolds number, e.g., 15,000,
where $D_{o1}$ is the initial diameter of the conduit portion, say 6", corresponding to the initial Reynolds number, and
where $D_{o2}$ is the diameter of the meter body conduit corresponding to the desired Reynolds number.

Applying Equation 7 to the present example in which it is desired to increase the Reynolds number from 9,500 to 15,000, a calculation for $D_{o2}$ may yield:

$$D_{o2}=(D_{o1}*Re_1)/Re_2=(6*9,500)/15,000=3.8 \text{ inches}$$

Without the central torpedo of this invention, the conduit portion size may have to step down to 3".

Certain embodiments herein relate to rounding up to the next available vortex ring generator size of 4 inches (for example, the 4-inch size may be the next available size above the 3.8-inch calculated diameter of the meter body conduit). By sizing up in this way, relatively less pressure drop may be experienced as compared to rounding down to the next available shedder size of 3 inches in conventional Vortex flowmeters.

A Reynolds number associated with a 4-inch diameter meter body may be calculated using Equation 7 as follows:

$$Re_2/Re_1=D_{o1}/D_{o2},$$

where $Re_2=(D_{o1}*Re_1)/D_{o2}=(6*9,500)/4=14,250$.

Thus, a Reynolds number of 14,250 may be associated with a reduced bore of 4 inches. The above bore reduction technique may be used in conjunction with inserting a torpedo into the 4-inch meter body conduit in the present example. In one embodiment, a diameter of the torpedo may be calculated based on the reduced bore diameter of 4 inches and its corresponding Reynolds number of 14,250 using Equation 6 above as follows:

$$D_{i2}^2=4^2*(1-(9,500/15,000))=0.8 \text{ inches}^2,$$

$D_{i2}$=approximately 0.9 inches. Thus a torpedo as described herein having a diameter of 0.9 inches may be inserted into a bore of a flanged meter body to achieve a Reynolds number of 15,000, which may optimize the performance of a Vortex ring flowmeter in certain embodiments herein. By virtue of using both a conduit bore reduction ($D_o$ is down from 6" to 4") and a torpedo insertion, a precise Reynolds number may be achieved, and hence, optimized performance. One or both of these techniques (torpedo insertion at the center and/or bore size reduction) may be used for achieving a certain Reynolds number in flanged meter bodies, in certain embodiments herein.

Figure 13:
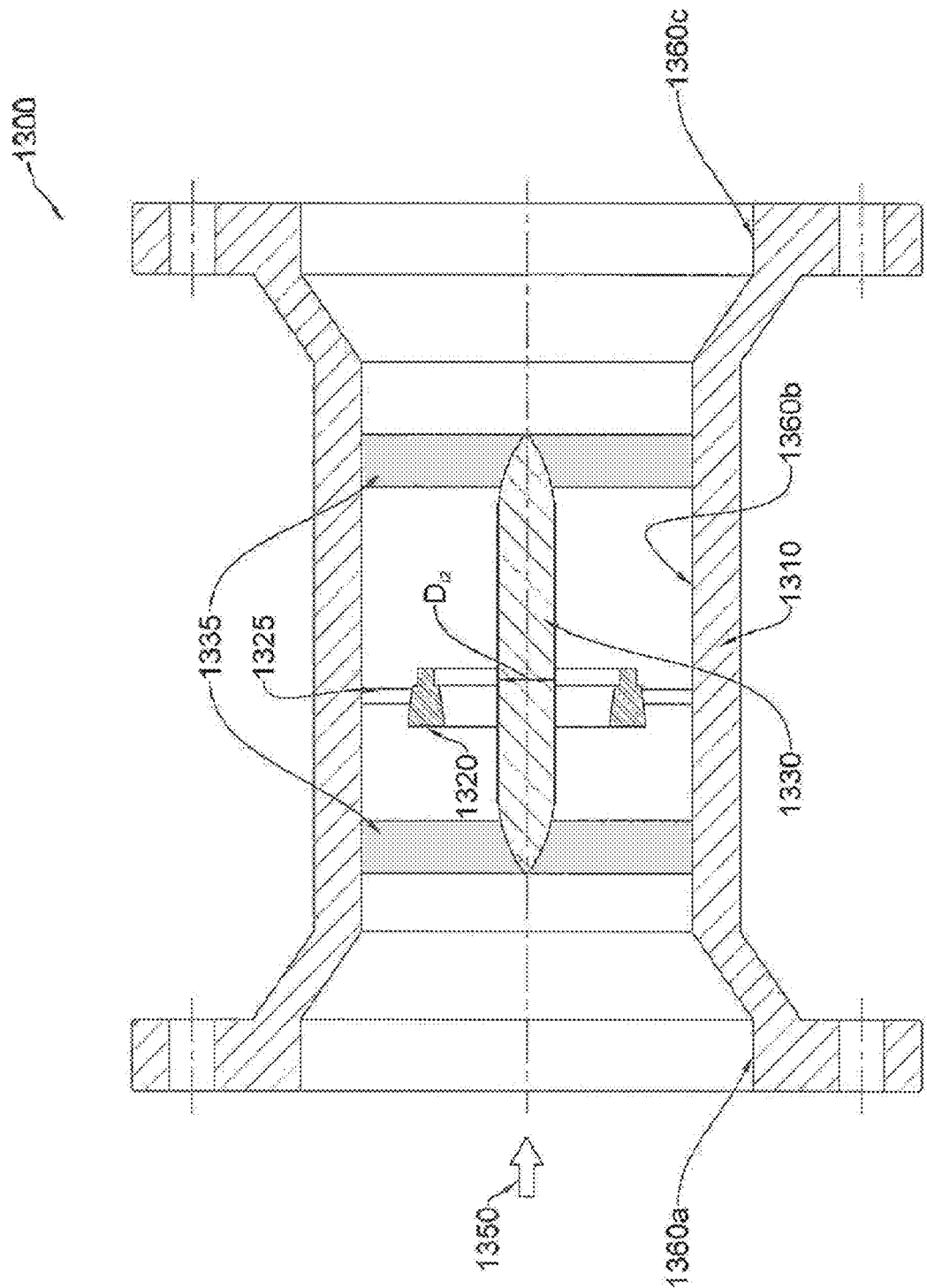
FIG. 13 illustrates a cross-sectional view of a Vortex ring flowmeter having both a central streamlined body and a reduced conduit bore area, according to an embodiment of the disclosure.

FIG. 13 depicts a cross-section of a flanged Vortex ring flowmeter 1300 having a conduit portion bore 1360b that was reduced and in which a torpedo 1330 was inserted to obtain a certain Reynolds number, for example, Re of 15,000 in the above example. In FIG. 13, the torpedo 1330 having a diameter ($D_{i2}$) may be secured to the meter body 1310 via one or more hanger plates 1335. The torpedo 1330 may be disposed within a vortex ring generator 1320, which may be secured to the meter body 1310 via one or more supports 1325.

The inlet conduit portion bore 1360a in FIG. 13 may be the point at which a relatively large conduit pipe may join the flanged meter body 1310. In the present example, the inlet bore 1360a may correspond to the pipe diameter ($D_{o1}$) of 6 inches, which may correspond to a Reynolds number (Re) of 9,500. The bore reduction in the present example may be illustrated by the smaller bore 1360b, which may correspond to a 4-inch diameter. Thus, the inlet bore 1360a may converge into the smaller bore 1360b in the central section of the meter body 1310, where the vortex ring generator 1320 may cause vortex shedding of fluid flowing in the direction indicated by the arrow 1350. To facilitate meeting the desired Reynolds number (Re) of 15,000, the torpedo 1330 having a diameter ($D_{i2}$) of 0.9 inches may be inserted into the central conduit portion section 1360b of the meter body 1310 as described above.

Fluid flowing downstream may leave the central conduit portion section 1360b of the meter body 1310 and enter an outlet section 1360c. The conduit portion of the Vortex ring flowmeter 1300 may increase at the outlet section 1360c such that it may match the inlet bore 1360a diameter, in one embodiment. The outlet section 1360c may include a diffuser to match the conduit pipe diameter, while maintaining a face-to-face length that is the same as that of the Vortex ring flowmeter, in one embodiment.

Figure 14:
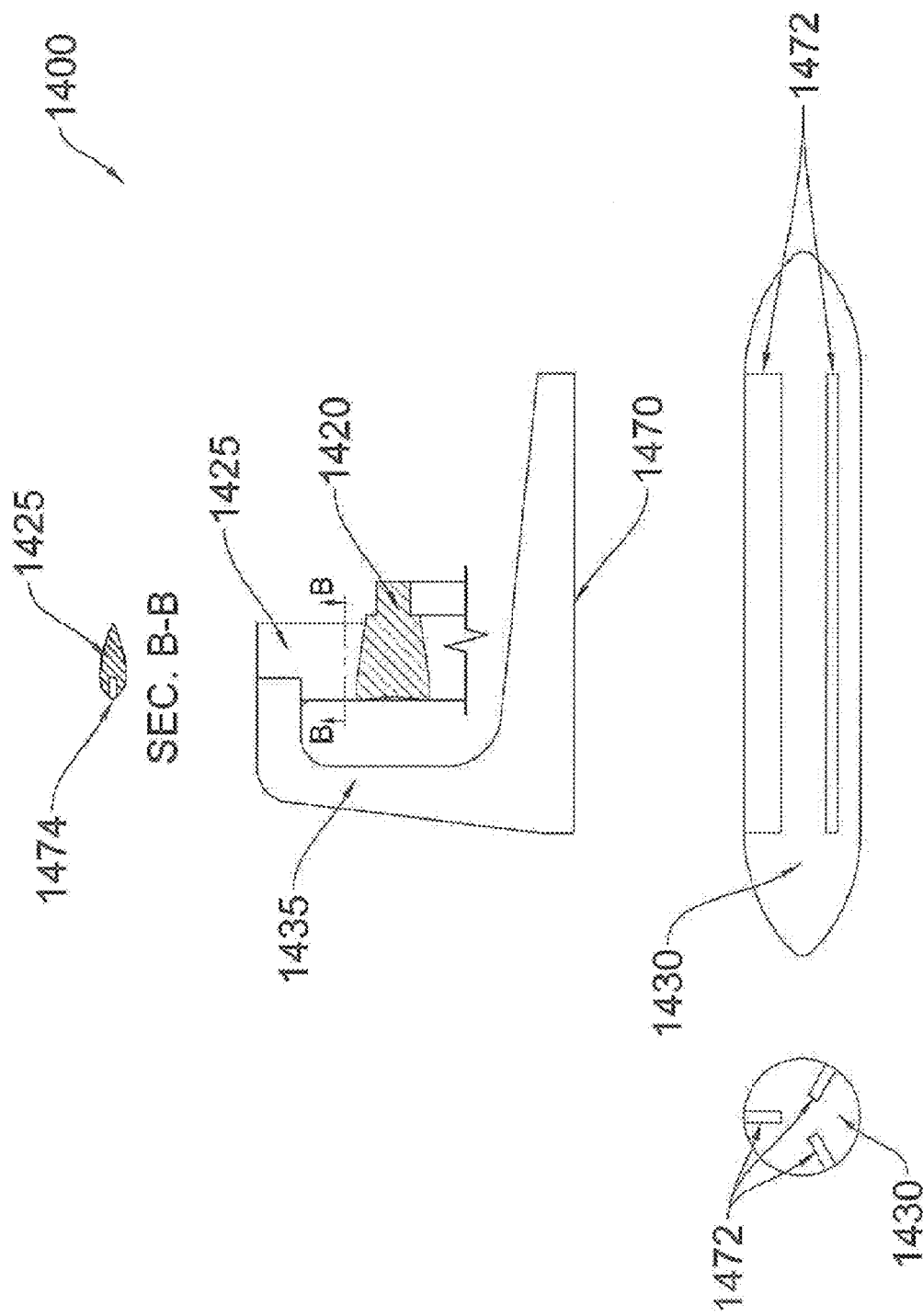
FIG. 14 illustrates example components for securing a central streamlined body to a Vortex ring flowmeter, according to an embodiment of the disclosure.

FIG. 14 depicts an example configuration 1400 for securing a torpedo 1430 to supports 1425 connected to a meter body of a Vortex ring flowmeter, according to an embodiment of the disclosure. The torpedo 1430 may have one or more slots 1472 into which a portion of a respective hanger plate 1435 may be inserted. The one or more slots 1472 may be longitudinal to receive a longitudinal edge 1470 of the hanger plate 1435. In one embodiment, the length of the edge 1470 may be sized to fit snugly into the slot 1472. One or more welds, adhesives, or other attachment mechanisms may also be used to secure the hanger plate 1435 in the slot 1472 and hence to the torpedo 1430.

Although three slots 1472 are shown in FIG. 14, fewer or more may exist in other configurations. The slots 1472 may have a depth such that the torpedo 1430 may overlap at least a portion of the hanger plate 1435. In one embodiment, the slots 1472 may be located an equal distance from one another around an arc of the torpedo 1430, although the spacing between the slots may vary in other embodiments.

A support 1425 may also be configured to receive the hanger plates 1435 to facilitate securing the torpedo 1430 in position. A first end of the support 1425 may include a groove or slot 1474 (as shown in FIG. 14) into which a portion of the hanger plate 1435 may be inserted. The hanger plate 1435 may be sized such that it fits snugly into the slot 1474 in the support 1425, in one embodiment. One or more welds, adhesives, or other attachment mechanisms may also be used to facilitate securing the hanger plate 1435 to the support 1425, and hence, to a meter body of a Vortex ring flowmeter. A second end of the support 1425 may be attached to the vortex ring generator 1420, as shown.

Figure 15A:
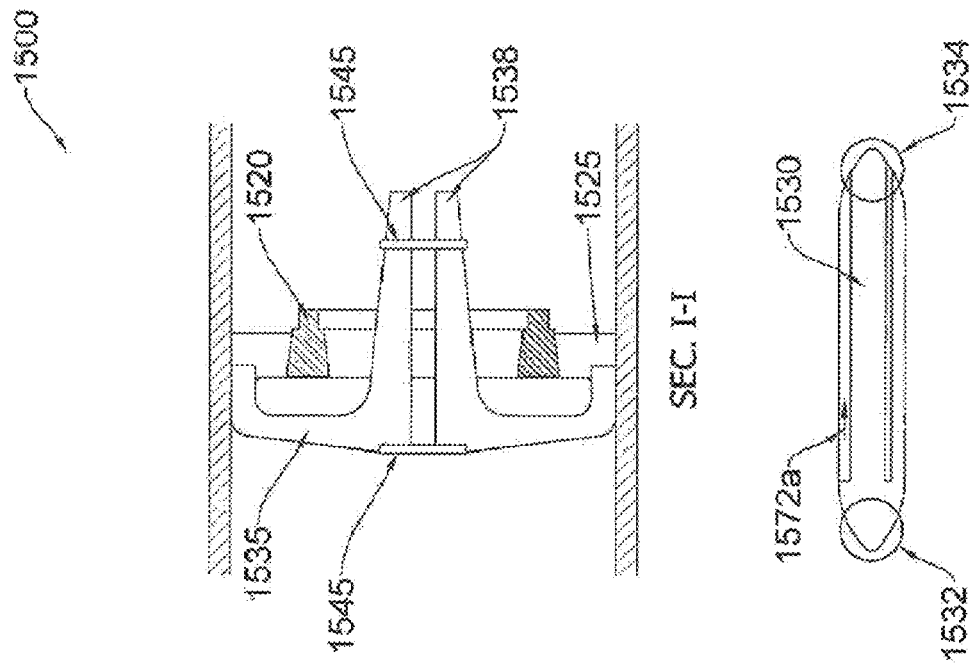
FIG. 15A illustrates an example configuration for mounting a replaceable central streamlined body to a Vortex ring flowmeter, according to an embodiment of the disclosure.

FIG. 15A depicts an example configuration for mounting a replaceable torpedo 1530 to a Vortex ring flowmeter 1500, according to an embodiment of the disclosure. The torpedo 1530 may include one or more grooves or slots 1572 (shown in FIG. 15B) for receiving a respective hanger plate 1535. A slot 1572 may stop at a location at the end of, or in proximity to, the end of the leading nose 1532 to prevent the torpedo 1530 from moving downstream. The slot 1572 may extend through the trailing nose 1534. To mount the torpedo 1530, the hanger plates 1535 may engage the slots 1572 on the downstream end 1534 of the torpedo 1530 then the torpedo may slide in direction 1572a. To remove the torpedo 1530, it may slide out in a direction opposite to the arrow 1572a. In one configuration, multiple hanger plates 1535 may be secured to each other via one or more rings 1545. In one embodiment, at least one ring may be located upstream of the vortex ring generator 1520 and at least one ring may be located downstream of the vortex ring generator 1520. All or at least a portion of the rings 1545 may be located upstream or downstream in other configurations.

According to one configuration, the hanger plates 1535 may include a respective groove into which the ring 1545 may be inserted to secure the hanger plates 1535 to each other. Such grooves may be aligned to facilitate securement of the hanger plates 1535 by the ring 1545. The ring 1545 and the respective groove in the hanger plate 1535 may be sized such that the ring 1545 fits snugly within the groove. The ring 1545 may be welded into the grooves or on the outside edge of the hanger plates 1535 according to some configurations. The diameter of the ring 1545 may be approximately (5-10%) larger than the maximum allowed torpedo diameter (for example, 0.4 $D_o$).

Figure 15B:
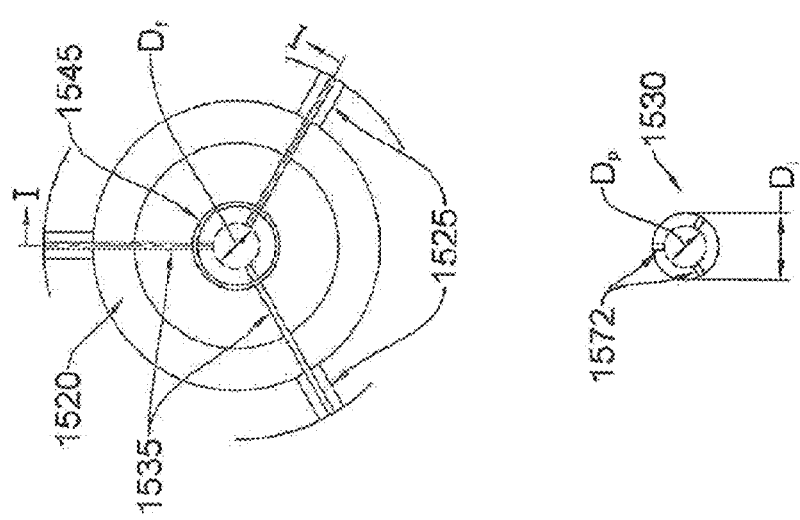
FIG. 15B illustrates a topographical view of the Vortex ring flowmeter in FIG. 15A, according to an embodiment of the disclosure.

FIG. 15B depicts a topographical view of the Vortex ring flowmeter 1500. As shown, supports 1525 may receive a respective hanger plate 1535, which may be attached to a torpedo 1530 on one end. Another end of the support 1525 may be attached to a meter body of the Vortex ring flowmeter 1500. As described, the ring 1545 may secure the hanger plates 1535 to each other. The slots 1572 in the torpedo 1530 may extend to a diameter ($D_p$) that is less than a diameter ($D_f$) that defines the inward radial extent of the hanger plate 1535. In this way, the slots 1572 may have a sufficient depth for receiving and securing the hanger plate 1535, whether the hanger plate fits snugly into a slot 1572 and/or is welded, adhered, or otherwise secured in the slot 1572.

FIG. 16A depicts a replaceable torpedo used in a flanged meter body 1610 of a Vortex ring flowmeter 1600, according to an embodiment of the disclosure. The flanged meter body 1610 may include hanger plates 1635 that may be inserted into a slot 1672 of the torpedo 1630. In one embodiment, the hanger plate 1635 may prevent the torpedo 1630 from moving downstream (for example, in the direction of the arrow 1650) by contacting a first end of the slot 1672 located at the end or proximate to the end of the leading nose 1632. The ring 1645 may secure the torpedo 1630 to the hanger plate 1635, in one configuration.

Turning to FIG. 16B, a diameter ($D_p$) of the torpedo 1630 is shown in comparison to a diameter ($D_f$) associated with the inward radial extent of the hanger plate 1635. As described above, the diameter $D_p$ associated with the slot 1672 may be less than the diameter $D_f$ to ensure that the slot 1672 has a sufficient depth for receiving and securing the hanger plate 1635. Also shown in FIG. 16B are the vortex ring generator 1620, supports 1625 that may secure the vortex ring generator 1620 to the meter body 1610, and the grooves or slots 1672 in the torpedo 1630, according to an example embodiment.

The above configurations are for purposes of illustration and are not meant to be limiting. A different number, type, shape, size, orientation, or other attributes of the components illustrated in the figures may exist in other example configurations.

All or at least a portion of the components in the figures described above, whether associated with the plate wafer body or the flanged body, may be formed from stainless steel (for example, 300 series, etc.), other metals, or various other materials. Further, all or at least a portion of the configuration described herein may be implemented via three-dimensional (3D) printing, near net casting technologies (for example, Investment/Lost wax casting, Replicast, etc.), or other technologies.

Different configurations of a torpedo as described herein may be used according to certain conditions. For example, in instances in which a minimum flow rate is known and operations are expected to be stable, a precise torpedo diameter may be calculated, machined, and permanently installed into the meter body of a Vortex ring flowmeter before the meter is installed at the customer site.

In instances in which changes in operating and/or start-up conditions are known, a replaceable torpedo, such as those described in FIGS. 15A, 15B, 16A, and 16B may be implemented. Wet calibration may be used for each torpedo size in such instances.

In instances in which changes in operating conditions are expected but the extent of the changes is unknown, hanger plates may be permanently mounted in the meter body of the Vortex ring flowmeter, and a torpedo may be installed in the flowmeter after the extent of the change in conditions becomes known. The torpedo size may be machined with grooves to slide over the hanger plates in such instances. A replaceable torpedo such as those described in FIGS. 15A, 15B, 16A, and 16B may be used in such instances. A wet or dry calibration may be performed in certain circumstances, such as whether the flowmeter is altered at the factory or in the field, respectively, as non-limiting examples.

In instances in which changes in operating conditions are unanticipated, the flowmeter may be removed from the line and equipped with an appropriately sized torpedo and/or bore diameter.

A wet calibration of a vortex flowmeter may require placing the flowmeter in a calibration loop to determine the K-factor (number of vortex pulses per unit flow volume through the conduit portion) and the linearity. The linearity may indicate a constant Strouhal Number (which may be referred to as a dimensionless number describing oscillating vortex flow mechanisms).

The Strouhal number may be given as St=fd/V,
where
f is the frequency of vortex shedding,
d is the characteristic length (see, FIG. 12), and
V is the velocity of the fluid.

Wet calibrations may be expensive and time consuming particularly when they are performed after each central torpedo change.

A dry calibration may be performed without placing the vortex flowmeter is a flow calibration loop. A dry calibration may rely on empirical dimensional data or on calculations based on the Reynolds number and a known K-factor value for a flowmeter before central torpedoes are added or changed. The relation between the K-factor and the area may be:

$$K_1/K_2=a_2/a_1, \text{ whereby } K_2=K_1*(a_1/a_2) \text{ or,}$$

$$K_2=K_1*(1/(1-(D_f/D_o)^2) \text{(referred herein to as Relation B3)}$$

where $K_1$ is the established K-factor value for the flowmeter with conduit bore cross-sectional $a_1$, and $K_2$ is the new K-factor that resulted from inserting a new central torpedo to reduce the conduit bore cross-sectional area down to $a_2$. $K_2$ is the new dry calibrated K-factor.

According to one or more of the above conditions, a Vortex flowmeter (equipped with a shedder bar or equipped with a vortex ring) may not need to be replaced but may be reconfigured with one or more segment insertions or torpedoes, in at least some situations. The configurations described above are non-limiting and are provided as examples of various components or elements that may be used to reduce the flow area in a flowmeter, such as a Vortex flowmeter. Although specific shapes, materials, arrangements, or positioning of mounting elements, connectors, substrates, pliable materials, fasteners, etc., are shown, numerous others may exist in other embodiments.

Further, the components or elements illustrated in the accompanying figures may also not be drawn to scale. For example, curves, shapes, or dimensions associated with the various components in the figures may not be actual but may instead provide an example of the features or attributes associated with the various types of components found in or otherwise associated with a Vortex flowmeter.

As used herein, the term "device" may refer to any computing component that includes one or more processors that may be configured to execute computer-readable, computer-implemented, or computer-executable instructions. Example devices can include personal computers, Internet appliances, application-specific circuits, server computers, server farms, digital assistants, smart phones, personal digital assistants, digital tablets, microcontrollers, minicomputers, transceivers, other processor-based devices, or other computing components that may receive external connections for extending information to or from computing components.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that certain features, elements, and/or operations are in any way required for one or more implementations.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A flowmeter comprising:
   a meter body comprising a conduit portion configured to receive fluid flowing through the meter body;
   a first circular segment of a cylinder coupled to a first wall of the conduit portion;
   a second circular segment of a cylinder coupled to a second opposing wall of the conduit portion, wherein the first circular segment and the second circular segment comprise a portion of a circle bound by a cord with an arc of the circle subtended by the cord; and
   a shedder body coupled to the conduit portion and disposed between the first circular segment and the second circular segment, wherein the shedder body is substantially parallel to the cord of at least one of the first circular segment or the second circular segment.

2. The flowmeter of claim 1, wherein the first and second circular segments comprise:
   a respective leading edge located upstream of the shedder body for accelerating the fluid through the meter body into the shedder body;
   a respective trailing edge located downstream of the shedder body; and
   a uniform central portion between the leading edge and the trailing edge.

3. The flowmeter of claim 1, wherein the conduit portion comprises a first conduit portion, and the flowmeter further comprises a second conduit portion coupled to the meter body, wherein the second conduit portion has a second diameter that is smaller than a first diameter of the first conduit portion.

4. The flowmeter of claim 3, wherein the smaller second diameter in the second conduit portion comprises a first circular segment and a second circular segment coupled to the walls of the smaller second conduit portion, whereby a total area reduction is achieved without additional undue pressure drop.

5. The flowmeter of claim 1, wherein the flowmeter further comprises a retaining ring for securing the first and second circular segments to the first wall and the opposing second wall, respectively, wherein the first and second circular segments comprise at least one respective groove for housing at least a portion of the retaining ring.

6. The flowmeter of claim 5, wherein the conduit portion comprises a groove that is aligned with the at least one respective groove for housing the retaining ring.

7. The flowmeter of claim 5, wherein the retaining ring and the at least one respective groove are configured to allow the first circular segment and the second circular segment to be removed from the conduit portion of the meter body.

8. The flowmeter of claim 7, wherein the removable first circular segment and second circular segment are replaceable without the need to replace the meter body.

9. The flowmeter of claim 1, wherein the respective size is based at least in part on a central angle and a height of the first and second circular segments, wherein the central angle and the height are based at least in part on the reduced cross-sectional flow area.

10. The flowmeter of claim 9, wherein the first and second circular segments are sized resulting in reducing the conduit portion flow area and changing the K-factor, wherein the K-factor is calculated without the need for a wet calibration.

11. An apparatus comprising:
a meter body comprising a conduit portion configured to receive fluid flowing through the meter body;
a shedder body disposed within the conduit portion;
a first circular segment of a cylinder coupled to a first wall of the conduit portion; and
a second circular segment of a cylinder coupled to a second opposing wall of the conduit portion, wherein the first circular segment and the second circular segment comprise a portion of a circle bound by a cord with an arc of the circle subtended by the cord, and wherein the shedder body is substantially parallel to the cord of the first circular segment and the second circular segment.

12. The apparatus of claim 11, wherein the first and second circular segments comprise:
a respective leading edge located upstream of the shedder body for accelerating the fluid through the meter body into the shedder body;
a respective trailing edge located downstream of the shedder body; and
a uniform central portion between the leading edge and the trailing edge.

13. The apparatus of claim 11, wherein the conduit portion comprises a first conduit portion, and the flowmeter further comprises a second conduit portion coupled to the meter body, wherein the second conduit portion has a second diameter that is smaller than a first diameter of the first conduit portion.

14. The apparatus of claim 13, wherein the smaller second diameter in the second conduit portion comprises a first circular segment and a second circular segment coupled to the walls of the smaller second conduit portion, whereby a total area reduction is achieved without additional undue pressure drop.

15. The apparatus of claim 11, wherein the apparatus further comprises a retaining ring for securing the first and second circular segments to the first wall and the opposing second wall, respectively, wherein the first and second circular segments comprise at least one respective groove for housing at least a portion of the retaining ring.

16. The apparatus of claim 15, wherein the conduit portion comprises a groove that is aligned with the at least one respective groove for housing the retaining ring.

17. The apparatus of claim 15, wherein the retaining ring and the at least one respective groove are configured to allow the first circular segment and the second circular segment to be removed from the conduit portion of the meter body.

18. The apparatus of claim 17, wherein the removable first circular segment and second circular segment are replaceable without the need to replace the meter body.

19. The apparatus of claim 11, wherein the respective size is based at least in part on a central angle and a height of the first and second circular segments, wherein the central angle and the height are based at least in part on the reduced cross-sectional flow area.

20. The apparatus of claim 19, wherein the first and second circular segments are sized resulting in reducing the conduit portion flow area and changing the K-factor, wherein the K-factor is calculated without the need for a wet calibration.

* * * * *